United States Patent [19]

Nakai et al.

[11] Patent Number: 4,803,509
[45] Date of Patent: Feb. 7, 1989

[54] CAMERA SYSTEM OPERABLE BY CARRYING DATA FROM A CAMERA ACCESSORY TO A CAMERA BODY

[75] Inventors: Masaaki Nakai, Kawachinagano; Masayoshi Sahara, Sennan; Nobuyuki Taniguchi, Nishinomiya, all of Japan

[73] Assignee: Minolta Camera Kabushiki Kaisha, Osaka, Japan

[21] Appl. No.: 130,990

[22] Filed: Dec. 9, 1987

Related U.S. Application Data

[60] Continuation of Ser. No. 578, Jan. 5, 1987, abandoned, which is a division of Ser. No. 790,511, Oct. 23, 1985, Pat. No. 4,673,275, which is a continuation of Ser. No. 478,910, Mar. 25, 1983, Pat. No. 4,560,267.

[30] Foreign Application Priority Data

| Mar. 26, 1982 | [JP] | Japan | 57-49768 |
| Mar. 30, 1982 | [JP] | Japan | 57-52740 |
| Apr. 1, 1982 | [JP] | Japan | 57-55187 |
| Nov. 5, 1982 | [JP] | Japan | 57-194968 |
| Feb. 2, 1983 | [JP] | Japan | 58-14929[U] |

[51] Int. Cl.$^4$ .................... G03B 7/095; G03B 7/20
[52] U.S. Cl. .................... 354/410; 354/423; 354/442; 354/455; 354/286
[58] Field of Search ........ 354/455, 270, 271.1, 354/274, 286, 289.11, 289.12, 269, 441, 442, 443, 410, 412, 423, 446

[56] References Cited

U.S. PATENT DOCUMENTS

| 2,949,076 | 8/1960 | Finkl | 354/274 |
| 3,394,644 | 7/1968 | Ettischer | 354/455 |
| 3,590,717 | 7/1971 | Raab | 354/269 X |
| 3,990,085 | 11/1976 | Shono | 354/455 X |
| 4,159,864 | 7/1979 | Yasukuni et al. | 354/271 |
| 4,290,674 | 9/1981 | Kobori et al. | 354/442 |
| 4,304,472 | 12/1981 | Shinoda et al. | 354/412 |
| 4,329,040 | 5/1982 | Fukino et al. | 354/286 |
| 4,357,090 | 11/1982 | Araki | 354/286 |
| 4,477,164 | 10/1984 | Nakai et al. | 354/286 |
| 4,560,267 | 12/1985 | Nakai et al. | 354/412 |
| 4,582,412 | 4/1986 | Wakabayashi | 354/442 |
| 4,623,234 | 11/1986 | Shimizu et al. | 354/442 X |

FOREIGN PATENT DOCUMENTS

| 48-11048 | 4/1973 | Japan . |
| 54-108628 | 8/1979 | Japan . |
| 54-147036 | 11/1979 | Japan . |
| 56-135829 | 10/1981 | Japan . |
| 56-155908 | 12/1981 | Japan . |
| 57-5032 | 1/1982 | Japan . |
| 57-5033 | 1/1982 | Japan . |

*Primary Examiner*—W. B. Perkey
*Attorney, Agent, or Firm*—Price, Gess & Ubell

[57] ABSTRACT

A camera system operable with data carried from a camera accessory to a camera body. The camera accessory has a ROM for storing various data at a plurality of addresses, respectively, each of which data consists of a plurality of bits, and a coupling terminal for receiving a train of clock pulses from the camera body. A circuit is also provided for sequentially designating the address of the ROM one by one to permit the ROM to output a data stored at the designated address. In the circuit, an address signal is formed in response to the clock pulses, received through the coupling terminal, for designating an address. The data derived from the ROM are transmitted to the camera body. The camera system can operate under different modes of exposure control and can identify the attachments of accessories as to their capacity to be responsive to different forms of exposure control systems, p rticularly when the attachment will either permit or prevent control of an aperture value from the camera body.

4 Claims, 16 Drawing Sheets

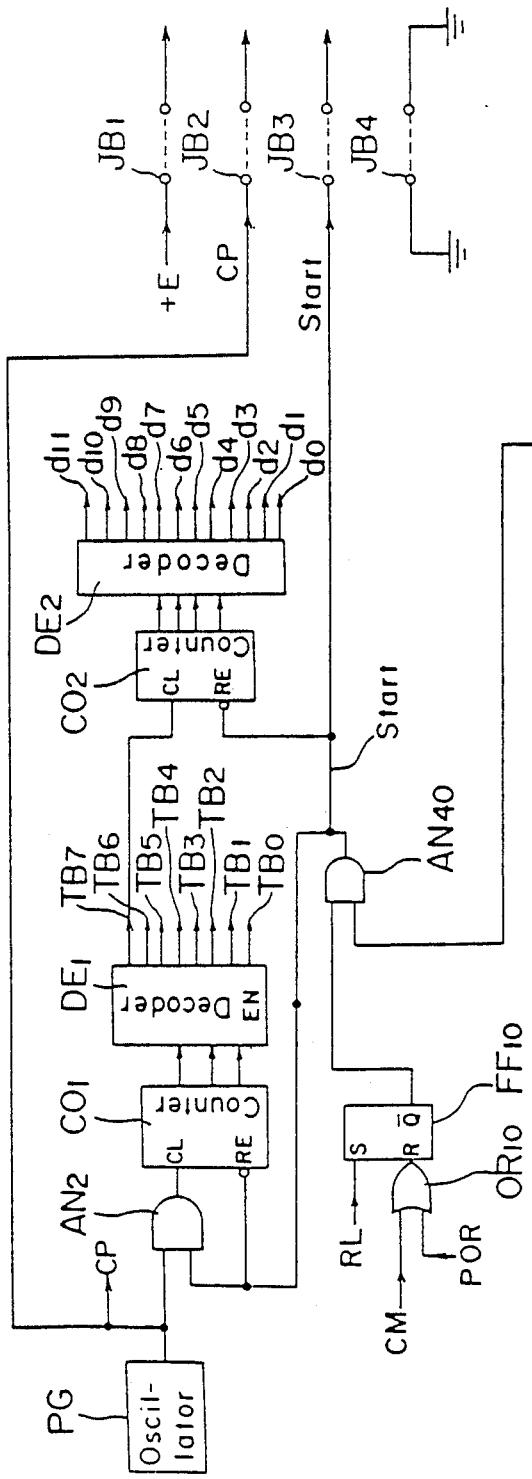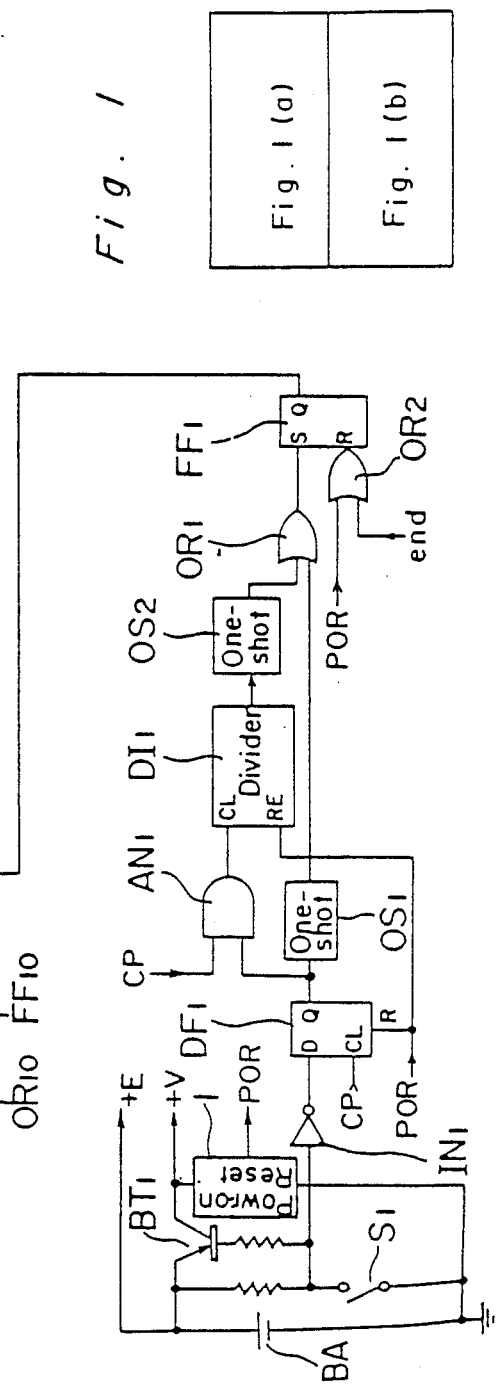
Fig. 1(a)
Fig. 1

Fig. 3

CAMERA SYSTEM OPERABLE BY CARRYING DATA FROM A CAMERA ACCESSORY TO A CAMERA BODY

This application is a division of application Ser. No. 000,578 filed Jan. 5, 1987 abandoned, which is a diversion of Ser. No. 790,511 filed Oct. 23, 1985 now U.S. Pat. No. 4,673,275 which is a continuation of Ser. No. 478,910 filed Mar. 25, 1983 now U.S. Pat. No. 4,560,267.

BACKGROUND OF THE INVENTION

1. Field of the Invention

This invention generally relates to a camera system comprising a camera accessory such as, for example, an interchangeable lens or a lens converter, and a camera body to which the camera accessory is coupled and, more particularly, to a camera system operable by carrying data, stored in the camera accessory to the camera body. This invention also relates to an improvement in the camera accessory or the camera body or a combination thereof utilizeable in the camera system of the type referred to above.

2. Description of the Prior Art

There has been well known a camera system comprising a camera accessory adapted to be coupled to a camera body and provided with an information storing and memorizing circuit (hereinafter referred to as a ROM) which stores various pieces of information peculiar to the camera accessory (for example, the maximum and minimum aperture values of an interchangeable lens in the case where the camera accessory is the interchangeable lens), so that desired pieces of information of the camera accessory can be read in the camera body by specifying corresponding addresses in the ROM. However, the practical design of such a system involves numerous problems.

In the first place, in the system of the type described above, a plurality of coupling terminals are necessary to electrically connect the camera accessory with the camera body for the transmission of signals therebetween. A control circuit for controlling the transmission of the signals between the camera body and the camera accessory through the coupling terminals is also necessitated. However, in terms of the reliability, the smaller the number of the coupling terminals, the better. Yet, it is desired to render the signal transmission control circuit to be compact in structure. Moreover, since the signals to be carried from the camera accessory to the camera body are diversified, specific counter measures therefore are desired to be embodied. A counter-measures is also required to render the camera body to cope with the camera accessory having no data to be carried to the camera body when it is coupled to the camera body.

Hitherto, however, those problems have not been solved and, even if solved, are solved unsatisfactorily.

SUMMARY OF THE INVENTION

Accordingly, this invention has for its essential object to provide an improved camera accessory and/or an improved camera body having the minimized number of the coupling terminals.

Another object of this invention is to provide an improved camera accessory and/or an improved camera body wherein improvement is made to enable the camera body to read the data from the camera accessory.

A further object of this invention is to improve the specific arrangement of the connecting terminals.

A still further object of this invention is to deal with the diversified data stored in the camera body.

A still further object of this invention is to provide the structure necessary to carry the data from the camera accessory to the camera body in the event that the data consist of a plurality of kinds of data variable with a piece of information set in the camera accessory.

A still further object of this invention is to provide an improved zoom lens assembly capable of transmitting information indicative of a change in effective aperture value thereof when the camera accessory is used in the form of the zoom lens assembly of a type having the effective aperture value variable with the zooming, and also an improved camera body operable upon receipt of the information.

A still further object of this invention is to deal with the change in effective aperture value which would result from the use of a lens converter, which is one of the camera accessories, between the camera body and the interchangeable lens assembly which is also another one of the camera accessories.

A still further object of this invention is to provide an improved camera body and an improved camera accessory both operable by transmitting data indicative of the time required to effect the control of the aperture of the interchangeable lens assembly which is one of the camera accessories.

According to one feature of this invention, address signals for addressing the data stored in the ROM in the camera accessory are not transmitted from the camera body, but are prepared in the camera accessory in response to clock pulses fed from the camera body. Accordingly, the numbers of the requisite coupling terminals can be minimized.

According to another feature of this invention, a counter for counting the clock pulses fed from the camera body is provided in the camera accessory and the address signals are prepared in correspondence with the contents of the upper bits thereof. On the other hand, the contents of the lower bits of the counter are used to control the serial feed of the data in the ROM addressed to the camera body. This serial data feed contributes to the reduction in number of the coupling terminals.

According to a further object of this invention, the clock pulses are generated in a predetermined number in response to each read-in instruction generated from a micro-computer in the camera body, which read-in instruction is repeated in a number of times.

As a further object of the invention, a camera system is provided capable of mounting a plurality of attachments, some of which are subject to aperture size adjustment from the camera body, and some of which are incapable of such aperture size adjustment. The camera body has the capacity of controlling exposure through a manual setting, through light transmitted through a fully open aperture, and through light transmitted through a stop down aperture. The camera body is further capable of identifying the type of attachment mounted and is capable of enabling the appropriate exposure control required for that type of attachment.

According to a still further object of this invention, in the event that the data variable with a piece of information set in the camera accessory are available in a plurality of kinds, these data are stored at different addresses of the ROM and one address signal is designated by a signal fed from the camera body for determining the kind of the data and the information set in the camera accessory. With this construction, the circuit for the control of the signal transmission can be simplified. Examples of the information set in the camera accessory according to this feature include the focal length of the zoom lens assembly whereas examples of the data variable therewith include the effective aperture value.

According to a still further feature of this invention, the information of the effective aperture value variable with change in focal length is stored in the zoom lens assembly and is transmitted to the camera body. Upon receipt of this information, the camera body utilizes it for the calculation of the stop-down number and the calculation of the through-the lens (TTL) measured information to compensate for an error resulting from change in focal length. In the case where the TTL measured information is AE-locked, different pieces of information of the effective aperture values are utilized for the calculation of the stop-down number and the calculation of the TTL measured information, respectively. According to a still further feature of this invention, even when the change in effective aperture value occurs as a result of the lens converter, this change can be compensated for during the calcultion of the stop-down number and that of the TTL measured information. In the practice of this invention, examples of the data that can be stored in the camera accessory include, in addition to that referred to in the foregoing, data of the time required for the control of the aperture with which in the camera body, the difference in timing between the time at which the aperture is stopped down and the time at which the mirror is cleared or shifted up can be controlled. According to a yet further feature of this invention, whether or not the camera accessory is of a type having data can be discriminated in the camera body by the identification of the particular data, whereby the mode of operation performed in the camera body can be automatically switched.

BRIEF DESCRIPTION OF THE DRAWINGS

These and other objects and features of this invention will become clear from the following description taken in conjunction with preferred embodiments thereof with reference to the accompanying drawings, in which:

FIG. 3 is a block diagram showing an electric circuit incorporated in any one of interchangeable lens assemblies which can be utilized in combination with the camera body having the circuit of FIG. 1 with or without the intervention of the lens adaptor having the circuit of FIG. 2;

DETAILED DESCRIPTION OF THE EMBODIMENTS

Figure 1B:
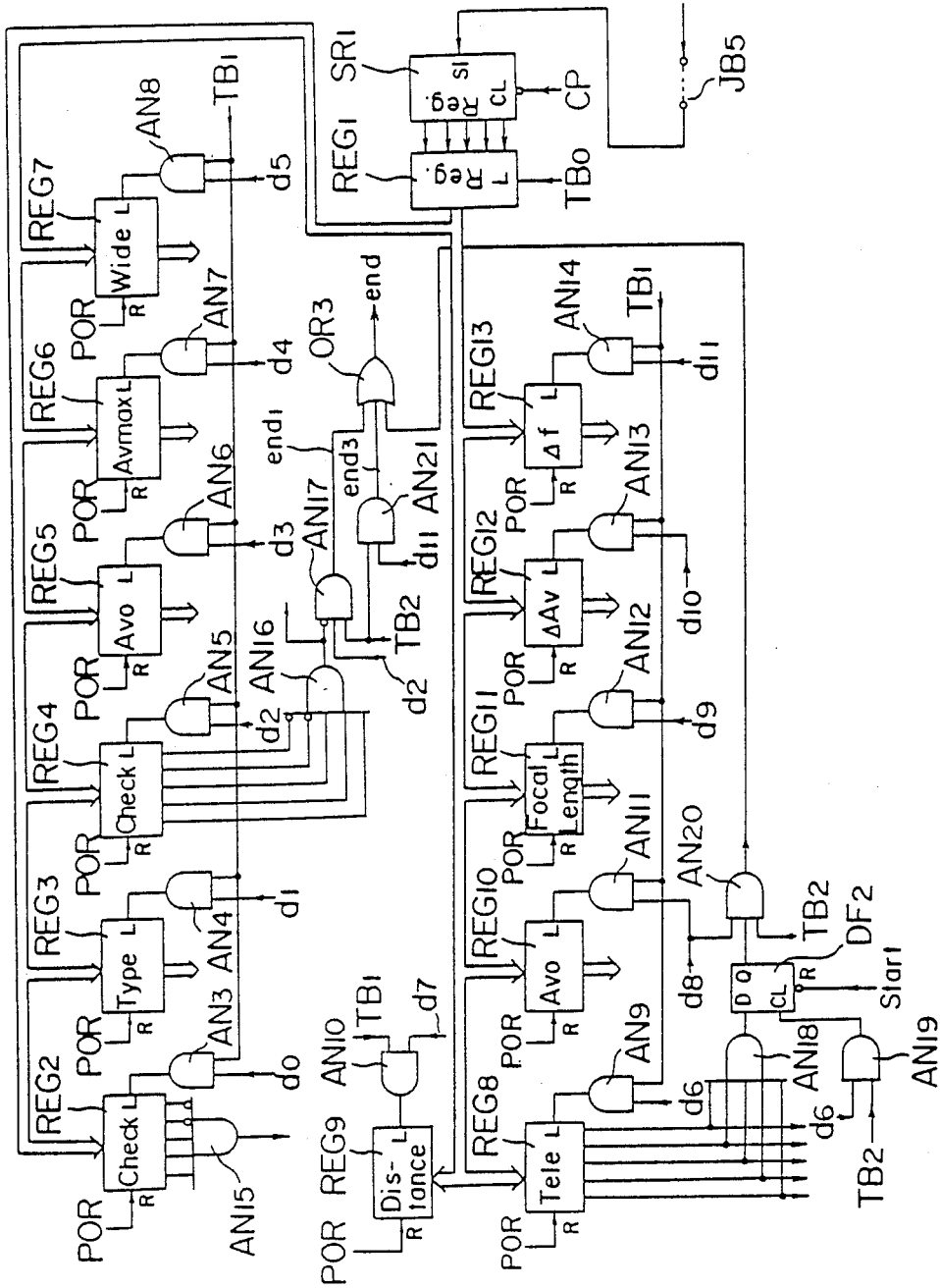
FIG. 1 is a block diagram showing an electric circuit incorporated in a photographic camera body, FIG. 1 being composed of FIGS. 1(a) and 1(b)

Before the description of this invention proceeds, it is to be noted that like parts are designated by like reference numerals throughout the accompanying drawings.

Figure 2:
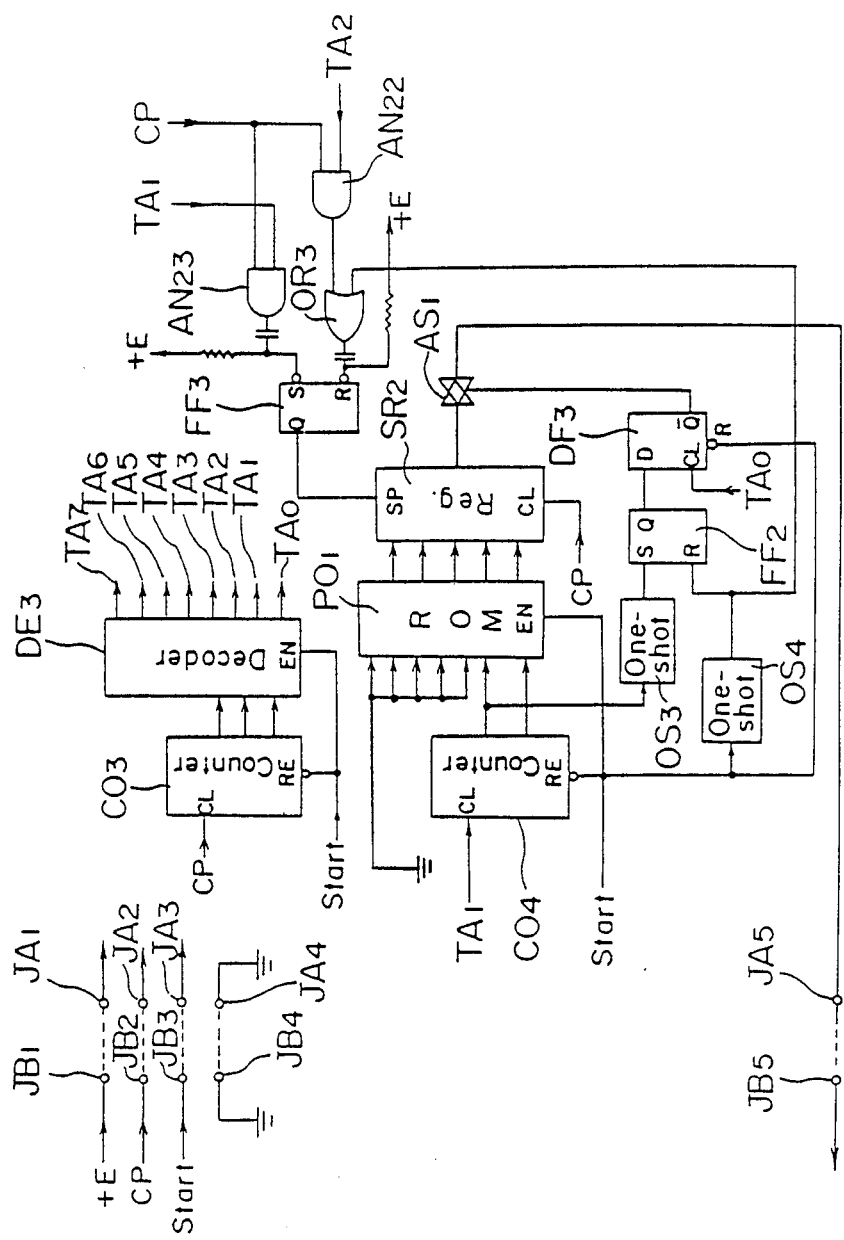
FIG. 2 is a block diagram showing an electric circuit incorporated in any one of lens adaptors which can be utilized in combination with the camera body having the circuit of FIG. 1.
Figure 3:
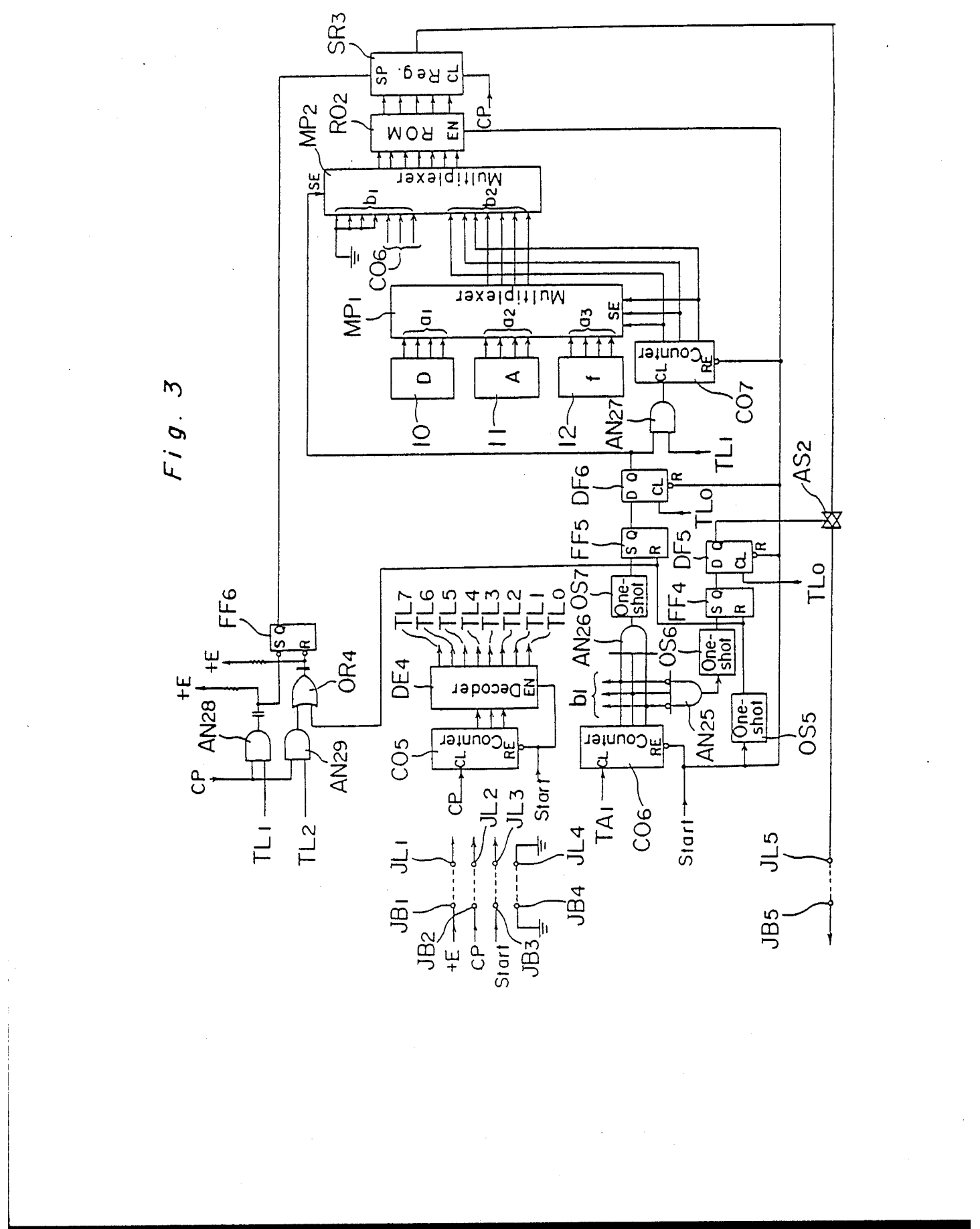

Referring to the drawings, FIG. 1 illustrates an electric circuit arrangement incorporated in the body of a photographic camera, FIG. 2 illustrates an electric circuit arrangement incorporated in any one of the lens adaptors which can be utilized in association with the camera embodying this invention, and FIG. 3 is an electric circuit arrangement incorporated in any one of the interchangeable lens assemblies which can be utilized in association with the camera embodying this invention. Referring particularly to FIG. 1, the circuit arrangement shown therein includes a source of electrical power BA, constituted by, for example, one or more batteries, and a light measuring switch S1 operatively coupled to a light measuring button (not shown) When this switch S1 is closed, a transistor BT1 conducts to allow an electric power from the power source BA to be fed through a power line +V to both a power-on reset circuit 1 and an exposure control unit as will be described later. The power-on reset circuit 1, when fed with an electric power through the power line +V, generates a power-on reset signal POR to reset a flip-flop FF1, registers REG 2 to REG 13, a D flip-flop DF1 and a divider DI1. All of the counters, flip-flops, registers, decoders and other circuit components shown therein are supplied with the electric power from the power source BA through the power line +E.

On the other hand, an inverter IN1 generates a high level signal in response to the closure of the light measuring switch S1, and when a clock pulse CP is applied to the D flip-flop DF1 from an oscillator PG while the output from the inverter IN1 is in a high level state, the D flip-flop DF1 generates a high level signal from its Q output terminal in response to the positive edge of the clock pulse CP. In response to the high level signal from the D flip-flop DF1, an AND gate AN1 is enabled to allow the passage of clock pulses CP therethrough to the divider DI1. The high level signal from the D flip-flop DF1 is also fed to a one-shot circuit OS1 to cause the latter to generate a high level pulse for a predetermined time, which is in turn supplied to the flip-flop FF1 through an OR gate OR1. In response to this high level pulse, the flip-flop FF1 is set with a high level output consequently generated from the Q output terminal thereof. At this time, a flip-flop FF10 is reset by the power-on reset signal and, therefore, an AND gate AN40 is enabled to allow the passage therethrough of the high level output from the flip-flop FF1. This high level output emerging from the AND gate AN40 is a start signal to be fed to the body of the photographic camera as well as a particular accessory for initiating the read-in operation.

In response to the start signal, an AND gate AN2 is enabled and, accordingly, counters CO1 and CO2 are released from reset conditions to bring a decoder DE1 in a condition ready to generate its output. The counter CO1 serves to count the number of clock pulses CP fed thereto from the oscillator PG through the AND gate AN2, and the decoder DE1 serves to render one of the output terminals TB0 to TB7 in a high level state depending on the output from the counter CO1. The relationship between inputs and outputs of the decoder DE1 is tabulated in Table 1 below.

TABLE 1

| Outputs from Counter CO1 | Outputs from Decoder DE1 | | | | | | | |
|---|---|---|---|---|---|---|---|---|
| | TB0 | TB1 | TB2 | TB3 | TB4 | TB5 | TB6 | TB7 |
| 000 | H | L | L | L | L | L | L | L |
| 001 | L | H | L | L | L | L | L | L |
| 010 | L | L | H | L | L | L | L | L |
| 011 | L | L | L | H | L | L | L | L |
| 100 | L | L | L | L | H | L | L | L |
| 101 | L | L | L | L | L | H | L | L |
| 110 | L | L | L | L | L | L | H | L |
| 111 | L | L | L | L | L | L | L | H |

Terminals JA1, JA2, JA3, JA4 and JA5 of the lens adaptor shown in FIG. 2 are adapted to be electrically connected with respective terminals JB1, JB2, JB3, JB4 and JB5 provided on the camera body. The terminal JA1 is a terminal to which a power line +E from the power source BA is connected through the terminal JB1; the terminal JA2 is a terminal to which the clock pulses CP are fed from the camera body through the terminal JB2; the terminal JA3 is a terminal to which the start signal is supplied from the camera body through the terminal JB3; the terminal JA4 is a terminal by which the ground potential is applied from the camera body through the terminal JB4; and the terminal JA5 is an output terminal through which an output from the circuit arrangement in the lens adaptor is supplied to the camera body by way of the terminal JB5. Terminals JL1, JL2, JL3, JL4 and JL5 of the interchangeable lens assembly shown in FIG. 3 are likewise adapted to be connected to the mating terminals JA1 to JA5, respectively, on the camera body. When the start signal appearing at the terminal JB3 on the camera body is supplied through the terminal JA3 or JL3, counters CO3 and CO4 and a D flip-flop DF3, all shown in FIG. 2, are released from the respective reset conditions, and a decoder DE3 and a read-only memory (ROM) RO1 are brought in a condition ready to generate a respective output. Simultaneously therewith, the start signal is also fed to a one-shot circuit OS4 and, consequently, flip-flops FF2 and FF3 are reset in response to a pulse from the one-shot circuit OS4. Similarly, in FIG. 3, counters CO5, CO6 and CO7 and D flip-flops DF5 and DF6 are released from the respective reset conditions, and a decoder DE4 and a read-only memory (ROM) R02 are brought in a condition ready to generate a respective output. In addition, in response to a pulse from a one-shot circuit OS5, flip-flops FF4, FF5 and FF6 are reset. The counter CO3 and decoder DE3 shown in FIG. 2 as well as the counter CO5 and decoder DE4 shown in FIG. 3 are of a construction identical with the counter CO1 and decoded DE1 shown in FIG. 1, and each of the decoders DE3 and DE4 generates a respective pulse from their output terminals TA0 to TA7 or TL0 to TL7 in timed relation to the pulse emerging from the output terminals TB0 to TB77 of the decoder DE1 whereby the circuit arrangement in the camera body and that in the accessory are synchronized with each other.

Hereinafter, the operation of the system will be described by way of example with the aid of Table 2, which illustrates the relationship between examples of data stored in the ROM for the storage of various data on the accessories at different addresses and the significances thereof, and Table 3 which illustrates the relationship between the coded data and the significances thereof.

TABLE 2

| Address | | | | | | | Significance | Data | Significance | |
|---|---|---|---|---|---|---|---|---|---|---|
| $a_6$ | $a_5$ | $a_4$ | $a_3$ | $a_2$ | $a_1$ | $a_0$ | | | | |
| 0 | 0 | 0 | 0 | 0 | 0 | 1 | Accessory check | 11100 | | |
| 0 | 0 | 0 | 0 | 0 | 1 | 0 | Accessory type | 00011 | Teleconverter A | |
| 0 | 0 | 0 | 0 | 0 | 1 | 1 | Lens check | 11100 | | |
| 0 | 0 | 0 | 0 | 1 | 0 | 0 | Lens Avo | 10100 | F 1.8 | |
| 0 | 0 | 0 | 0 | 1 | 0 | 1 | Lens Avmax | 10001 | F 22 | |
| 0 | 0 | 0 | 0 | 1 | 1 | 0 | Shortest focal length | 01100 | 50 mm | |
| 0 | 0 | 0 | 0 | 1 | 1 | 1 | Longest focal length | 11111 | Fixed | |
| 0 | 0 | 1 | 0 | 0 | 0 | 0 | Distance | 11111 | ∞ | Distance |
| 0 | 0 | 1 | 0 | 0 | 0 | 1 | Adjustment | 01101 | 4 m | Scale Reading |
| 0 | 0 | 1 | 0 | 0 | 1 | 0 | Shifting Amount | 01001 | 2 | On 50 mm Lens |
| 0 | 0 | 1 | 0 | 0 | 1 | 1 | | 00111 | 1.4 | |
| 0 | 0 | 1 | 0 | 1 | 0 | 0 | | 00110 | 1.2 | |
| 0 | 0 | 1 | 0 | 1 | 0 | 1 | | 00101 | 1 | |
| 0 | 0 | 1 | 0 | 1 | 1 | 0 | | 00100 | 0.85 | |
| 0 | 0 | 1 | 0 | 1 | 1 | 1 | | 00011 | 0.7 | |
| 0 | 0 | 1 | 1 | 0 | 0 | 0 | | 00010 | 0.6 | |
| 0 | 0 | 1 | 1 | 0 | 0 | 1 | | 00010 | 0.6 | |
| 0 | 0 | 1 | 1 | 0 | 1 | 0 | | 00001 | 0.5 | |
| 0 | 0 | 1 | 1 | 0 | 1 | 1 | | 00001 | 0.5 | |
| 0 | 0 | 1 | 1 | 1 | 0 | 0 | | 00001 | 0.5 | |

TABLE 2-continued

| a6 | a5 | a4 | a3 | a2 | a1 | a0 | Significance | Data | Significance | |
|---|---|---|---|---|---|---|---|---|---|---|
| 0 | 0 | 1 | 1 | 1 | 0 | 1 | | 00001 | 0.5 | |
| 0 | 0 | 1 | 1 | 1 | 1 | 0 | | 00001 | 0.5 | |
| 0 | 0 | 1 | 1 | 1 | 1 | 1 | | 00001 | 0.5 | |
| 0 | 1 | 0 | 0 | 0 | 0 | 0 | Stop-down | 10100 | 1.8 | F-number Reading |
| 0 | 1 | 0 | 0 | 0 | 0 | 1 | Number | 00011 | 2 | on 50 mm Lens |
| 0 | 1 | 0 | 0 | 0 | 1 | 0 | | 00100 | 2.5 | |
| 0 | 1 | 0 | 0 | 0 | 1 | 1 | | 00101 | 2.8 | |
| 0 | 1 | 0 | 0 | 1 | 0 | 0 | | 00110 | 3.5 | |
| 0 | 1 | 0 | 0 | 1 | 0 | 1 | | 00111 | 4 | |
| 0 | 1 | 0 | 0 | 1 | 1 | 0 | | 01000 | 4.5 | |
| 0 | 1 | 0 | 0 | 1 | 1 | 1 | | 01001 | 5.6 | |
| 0 | 1 | 0 | 1 | 0 | 0 | 0 | | 01010 | 6.7 | |
| 0 | 1 | 0 | 1 | 0 | 0 | 1 | | 01011 | 8 | |
| 0 | 1 | 0 | 1 | 0 | 1 | 0 | | 01100 | 9.5 | |
| 0 | 1 | 0 | 1 | 0 | 1 | 1 | | 01101 | 11 | |
| 0 | 1 | 0 | 1 | 1 | 0 | 0 | | 01110 | 13 | |
| 0 | 1 | 0 | 1 | 1 | 0 | 1 | | 01111 | 16 | |
| 0 | 1 | 0 | 1 | 1 | 1 | 0 | | 10000 | 19 | |
| 0 | 1 | 0 | 1 | 1 | 1 | 1 | | 10001 | 22 | |
| 0 | 1 | 1 | 0 | 0 | 0 | 0 | Focal Length | 01001 | 35 mm | Focal Length |
| 0 | 1 | 1 | 0 | 0 | 0 | 1 | Adjustment | 01010 | 40 | Reading on |
| 0 | 1 | 1 | 0 | 0 | 1 | 0 | Shifting Amount | 01011 | 45 | 35–135 mm |
| 0 | 1 | 1 | 0 | 0 | 1 | 1 | | 01100 | 50 | Zoom Lens |
| 0 | 1 | 1 | 0 | 1 | 0 | 0 | | 01101 | 55 | |
| 0 | 1 | 1 | 0 | 1 | 0 | 1 | | 01110 | 60 | |
| 0 | 1 | 1 | 0 | 1 | 1 | 0 | | 01111 | 70 | |
| 0 | 1 | 1 | 0 | 1 | 1 | 1 | | 10000 | 75 | |
| 0 | 1 | 1 | 1 | 0 | 0 | 0 | | 10001 | 85 | |
| 0 | 1 | 1 | 1 | 0 | 0 | 1 | | 10010 | 100 | |
| 0 | 1 | 1 | 1 | 0 | 1 | 0 | | 10011 | 120 | |
| 0 | 1 | 1 | 1 | 0 | 1 | 1 | | 10100 | 135 | |
| 1 | 0 | 0 | 0 | 0 | 0 | 0 | Focal Length | 00000 | 0 | ΔAv of |
| 1 | 0 | 0 | 0 | 0 | 0 | 1 | Adjustment | 00000 | 0 | 35–135 mm |
| 1 | 0 | 0 | 0 | 0 | 1 | 0 | Shifting Amount | 00000 | 0 | Zoom Lens |
| 1 | 0 | 0 | 0 | 0 | 1 | 1 | | 00000 | 0 | |
| 1 | 0 | 0 | 0 | 1 | 0 | 0 | | 00000 | 0 | |
| 1 | 0 | 0 | 0 | 1 | 0 | 1 | | 00001 | 1/8 | |
| 1 | 0 | 0 | 0 | 1 | 1 | 0 | | 00001 | 1/8 | |
| 1 | 0 | 0 | 0 | 1 | 1 | 1 | | 00010 | 2/8 | |
| 1 | 0 | 0 | 1 | 0 | 0 | 0 | | 00010 | 2/8 | |
| 1 | 0 | 0 | 1 | 0 | 0 | 1 | | 00011 | 3/8 | |
| 1 | 0 | 0 | 1 | 0 | 1 | 0 | | 00101 | 6/8 | |
| 1 | 0 | 0 | 1 | 0 | 1 | 1 | | 01000 | 8/8 | |
| 1 | 0 | 1 | 0 | 0 | 0 | 0 | Focal Length | 00001 | 1 (35 mm) | Zone on 35–135 mm |
| 1 | 0 | 1 | 0 | 0 | 0 | 1 | Adjustment | 00001 | 1 (40) | Zoom Lens |
| 1 | 0 | 1 | 0 | 0 | 1 | 0 | Shifting Amount | 00001 | 1 (45) | |
| 1 | 0 | 1 | 0 | 0 | 1 | 1 | | 00001 | 1 (50) | |
| 1 | 0 | 1 | 0 | 1 | 0 | 0 | | 00010 | 2 (55) | |
| 1 | 0 | 1 | 0 | 1 | 0 | 1 | | 00010 | 2 (60) | |
| 1 | 0 | 1 | 0 | 1 | 1 | 0 | | 00010 | 2 (70) | |
| 1 | 0 | 1 | 0 | 1 | 1 | 1 | | 00100 | 3 (75) | |
| 1 | 0 | 1 | 1 | 0 | 0 | 0 | | 00100 | 3 (85) | |
| 1 | 0 | 1 | 1 | 0 | 0 | 1 | | 01000 | 4 (100) | |
| 1 | 0 | 1 | 1 | 0 | 1 | 0 | | 10000 | 5 (120) | |
| 1 | 0 | 1 | 1 | 0 | 1 | 1 | | 10000 | 5 (135) | |

TABLE 3

| Data Code | F-stop Number | Distance | Focal Length | Av | Type of Accessory |
|---|---|---|---|---|---|
| 0 0 0 0 0 | 1.2 | 0.5 m | below 8 mm | 0 | |
| 0 0 0 0 1 | 1.4 | 0.6 | 12.5 | 1/8 | bellows A |
| 0 0 0 1 0 | 1.7 | 0.7 | 16 | 2/8 | rev. adap. A |
| 0 0 0 1 1 | 2 | 0.85 | 18 | 3/8 | teleconverter A |
| 0 0 1 0 0 | 2.5 | 1 | 20 | 4/8 | extension ring A |
| 0 0 1 0 1 | 2.8 | 1.2 | 24 | 5/8 | |
| 0 0 1 1 0 | 3.5 | 1.4 | 25 | 6/8 | |
| 0 0 1 1 1 | 4 | 1.7 | 28 | 7/8 | |
| 0 1 0 0 0 | 4.5 | 2 | 30 | 8/8 | |
| 0 1 0 0 1 | 5.6 | 2.5 | 35 | 9/8 | bellows M |
| 0 1 0 1 0 | 6.7 | 2.8 | 40 | 10/8 | rev. adap. M |
| 0 1 0 1 1 | 8 | 3.5 | 45 | 11/8 | teleconverter M |
| 0 1 1 0 0 | 9.5 | 4 | 50 | 12/8 | extension ring M |
| 0 1 1 0 1 | 11 | 4.5 | 55 | | |
| 0 1 1 1 0 | 13 | 5.6 | 60 | | |
| 0 1 1 1 1 | 16 | 6.7 | 70 | | |
| 1 0 0 0 0 | 19 | 8 | 75 | | |
| 1 0 0 0 1 | 22 | 9.5 | 85 | | |
| 1 0 0 1 0 | 27 | 11 | 100 | | |
| 1 0 0 1 1 | 32 | 13 | 120 | | |
| 1 0 1 0 0 | 1.8 | 16 | 135 | | |
| 1 0 1 0 1 | 1.9 | 19 | 180 | | |
| 1 0 1 1 0 | 3.3 | 22 | 200 | | |
| 1 0 1 1 1 | 3.6 | 27 | 250 | | |
| 1 1 0 0 0 | 3.8 | 32 | 300 | | |
| 1 1 0 0 1 | 4.2 | 40 | 360 | | |
| 1 1 0 1 0 | 4.3 | 45 | 400 | | |
| 1 1 0 1 1 | 5 | 54 | 500 | | |
| 1 1 1 0 0 | 6.3 | 64 | 600 | | |
| 1 1 1 0 1 | 6.5 | 80 | 800 | | |
| 1 1 1 1 0 | 6.9 | 91 | 1000 or more | | |
| 1 1 1 1 1 | | ∞ | fixed | | |

Referring to Table 2, since the flip-flop FF2 is reset through the one-shot circuit OS4 when the start signal is outputed, the Q output of the D flip-flop DF3 remains in a high level state even though the D flip-flop DF3 is released from the reset condition, and therefore, a switching circuit AS1 remains in a conducting state. Similarly, even in the circuit shown in FIG. 3, the Q output of the D flip-flop DF5 remains in a low level state and a switching circuit AS2 remains in a non-conducting state. In this case, data from the lens adaptor can be transmitted to the camera body. In the first place, the counter CO4 generates an output signal "01" in response to the pulse from the output terminal TA1 of the decoder DE3, and therefore, the ROM RO1 is supplied with an input signal "0000001" as an address. Upon receipt of the signal "0000001" by the ROM RO1, a particular location of the ROM RO1 where a check code "11100" for the adaptor is stored is designated and the ROM RO1 subsequently generates data "11100". On the other hand, the flip-flop FF3 is set in response to the negative edge of the clock pulse CP which emerges from an AND gate AN23 when the output terminal TA1 is in a high level state, and is reset in response to the negative edge of the clock pulse CP which emerges from an AND gate AN22 when the output terminal TA2 is in a high level state. Accordingly, the Q output of the flip-flop FF3 is in a high level state during the high level state of the output terminal TA2, and in response to the positive edge of the clock pulse CP during this period, that is, at the time the output from the output terminal TA2 sets up to a high level state, the data from the ROM RO1 are parallelly fed to a shift register SR2. Subsequently, in synchronism with the positive edge of the clock pulse CP applied to an input terminal CL, the above described data are outputed serially from the most significant bit and are then taken in a shift register SR1, shown in FIG. 1, through the switching circuit AS1 and then through the terminals JA5 and JB5. At this time, the shift register SR1 takes in the data from the terminal JB5 bit by bit in response to the negative edge of the clock pulses CP. Since the data transferred from the lens adaptor are comprised of five bits, the first bit of the data fed at a timing corresponding to the positive edge of the output from the terminal TA3 is taken in the shift register SR1 in the camera body at a timing corresponding to the negative edge of the clock pulse CP during the high level state of the output from the output terminal TB3 and, thereafter, the succeeding bits are fed one by one at different timings corresponding to the positive edges of the respective outputs from the output terminals TA4, TA5, TA6 and TA7. In this way, the read-in operation of one data completes in response to the negative edge of the clock pulse during the high level state of the output from the output terminal TB7 and output data from the shift register SR1 are parallelly latched in a register REG1 at a timing corresponding to the positive edge of the output subsequently emerging from the output terminal TB0. Inputs and outputs of a decoder DE1 in the camera body have the relationship as tabulated in Table 4 below.

TABLE 4

| Outputs from Counter CO2 | Outputs from Decoder DE2 | | | | | | | | | | | |
|---|---|---|---|---|---|---|---|---|---|---|---|---|
| | d0 | d1 | d2 | d3 | d4 | d5 | d6 | d7 | d8 | d9 | d10 | d11 |
| 0 0 0 0 | L | L | L | L | L | L | L | L | L | L | L | L |
| 0 0 0 1 | H | L | L | L | L | L | L | L | L | L | L | L |

TABLE 4-continued

| Outputs from Counter CO2 | Outputs from Decoder DE2 | | | | | | | | | | | |
|---|---|---|---|---|---|---|---|---|---|---|---|---|
| | d0 | d1 | d2 | d3 | d4 | d5 | d6 | d7 | d8 | d9 | d10 | d11 |
| 0 0 1 0 | L | H | L | L | L | L | L | L | L | L | L | L |
| 0 0 1 1 | L | L | H | L | L | L | L | L | L | L | L | L |
| 0 1 0 0 | L | L | L | H | L | L | L | L | L | L | L | L |
| 0 1 0 1 | L | L | L | L | H | L | L | L | L | L | L | L |
| 0 1 1 0 | L | L | L | L | L | H | L | L | L | L | L | L |
| 0 1 1 1 | L | L | L | L | L | L | H | L | L | L | L | L |
| 1 0 0 0 | L | L | L | L | L | L | L | H | L | L | L | L |
| 1 0 0 1 | L | L | L | L | L | L | L | L | H | L | L | L |
| 1 0 1 0 | L | L | L | L | L | L | L | L | L | H | L | L |
| 1 0 1 1 | L | L | L | L | L | L | L | L | L | L | H | L |
| 1 1 0 0 | L | L | L | L | L | L | L | L | L | L | L | H |

The counter CO2 having its output terminals connected to input terminals of the decoder DE2 is incremented by one in response to the positive edge of each pulse from the output terminal TB7. On the other hand, at the time the initial data, that is, the check data are latched in the register REG1 at a timing corresponding to the positive edge of the pulse from the output terminal TB0, the output terminal d0 of the decoder DE2 is in a high level state. Accordingly, the positive edge of the pulse from the output terminal TB1 is applied to a latch terminal of the register REG2 through an AND gate AN3 so that the data from the register REG1 can be latched in this register REG2. An output signal from the register REG2 is discriminated by an AND gate AN15 as to whether or not it is "11100" and when it is "11100" in view of the fact that the lens adaptor is coupled to the camera body, the AND gate AN15 generates a high level signal, whereas when the lens adaptor is not coupled to the camera body, the AND gate AN15 generates a low level signal. The output from this AND gate AN15 is in turn fed to, for example, a display unit (not shown) so designed as to indicate the presence or absence of the lens adaptor.

In FIG. 2 the counter CO4 generates an output signal "10" in response to the positive edge of the pulse emerging from the output terminal TA1 and the address "0000010" of the ROM RO1 is specified. As a result of this, data indicative of the type of the lens adaptor are outputed from the ROM RO1 as shown in Table 2. These data are fixed, so that as shown in Table 3, an automatic bellows of a type having a capability of transmitting a physical aperture control information between the camera body and the lens assembly is represented by "00001" and an automatic reverse adaptor of a type having a capability of transmitting a physical aperture control information between the camera body and the lens assembly is represented by "00010". These data are also latched, in a manner similar to that described above, in the register REG1 in the camera body at a timing at which the output terminal TB0 is rendered in a high level state, and at this time, the counter CO2 generates an output "0010". In response to the signal "0010" from the counter CO2, the output terminal d1 of the decoder DE2 is rendered in a high level state and, accordingly, the data fed from the register REG1 are latched in the register REG3.

When the counter CO4 generates an output "10", the one-shot circuit OS3 generates a high level signal which is in turn supplied to the flip-flop FF2 to set the latter. Subsequently, at the timing corresponding to the positive edge of the high level output at the terminal TA0-,(It is to be noted that at this time transfer of the data indicative of the type of the lens adaptor have already been completed.), a low level signal is fed from the $\overline{Q}$ output terminal of the flip-flop FF2 to the D input terminal of the D flip-flop DF3, thereby bringing the switching circuit AS1 into a non-conductive state to cease the transfer of the data from the lens adaptor.

In a manner similar to the counter CO2 shown in FIG. 2, the couneer CO3 shown in FIG. 3 also counts the positive edge of the high level pulse at the output terminal TL1 and, when the count output becomes "010", an AND gate AN25 generates a high level signal which is applied to a one-shot circuit OS6 to cause the latter to generate, in response to the positive edge of the high level signal from the AND gate AN25, a high level pulse with which the flip-flop FF4 is set. As is the case with the D flip-flop DF3 shown in FIG. 2, the Q output from the D flip-flop DF5 is brought in a high level state in response to the positive edge of the high level signal at the output terminal TL0 and, therefore, the switching circuit AS2 is brought into a conductive state thereby enabling the transfer of the data from the interchangeable lens assembly. At the positive edge of the subsequent high level signal at the output terminal TL1, the counter CO6 generates an output signal "011". This three bit signal from the counter CO6 is given to the least significant three bits of the inputs b1 of a multiplexer MP2. Since the Q output from the D flip-flop DF6 is still in a low level state, the multiplexer MP2 generates data "0000011" from its input b1, which data become an address signal to be fed to the ROM R02. Then, as shown in Table 2, the data "11100" for checking purpose are outputed from the ROM R02 and are read in the register REG4 shown in FIG. 1 in a manner similar to that described hereinbefore. It is to be noted that AND gates AN28 and AN29, an OR gate OR4, the flip-flop FF6 and a shift register SR3, shown in FIG. 3, are of a circuit construction similar to AND gates AN23 and AN24, an OR gate OR3, the flip-flop FF3 and the shift register SR2, show in FIG. 2, respectively.

The data which have been read in the register REG4 are checked by an AND gate AN16 as to whether or not they are "11100". If they are not found "11100", this means that the interchangeable lens assembly has not been coupled to the camera body, and in such case the AND gate AN16 generates a low level signal and an AND gate AN17 is then enabled to allow the passage of the pulse from the output terminal TB2 therethrough in the form of a read-in completion signal end1. Thereafter, in response to the positive edge of each high level pulse appearing at the output terminal TL1, the counter CO6 successively generates output signals "100", "101", "110" and "111" and, accordingly, address data "0000100", "0000101", "0000110" and "0000111" are successively outputed from the multiplexer MP2. As shown in Table 2, pieces of information of the interchangeable lens assembly including the minimum available F-number Avo, the maximum available F-number Avmax, the shortest focal length and the longest focal length are stored at the above described addresses of the ROM R02. Referring to Table 3, the data on the F-number are defined such that the ordinarily utilized F-numbers within the range of F-1.2 to F-32 and spaced at intervals of 0.5 Ev are represented by "00000" to "10011" whereas the F-numbers within the range of F1.8 to F6.9, which are not spaced at interval of 0.5 Ev, but which represent the minimum available F-number of a certain lens assembly, are represented by "10100" to "11110". On the other hand, with respect to the data on the focal length, the focal length is classified into not longer than 8 mm, 12.5 mm, 16 mm, ... 800 mm and not shorter than 1000 mm as shown in Table 3, which are respectively represented by "00000", "00001", ... "11101" and "11110". In addition, at the addresses "0000110" and "0000111", the shortest and longest focal lengths of a zoom lens assembly are stored. In the case of lens assembly of a fixed focal length, the data on the above described focal length and the data "11111" indicative of the fixed focal length are stored respectively at the addresses "0000110" and "0000111". Accordingly, in response to the successive generation of the above described address data "0000100" to "0000111" from the multiplexer MP2, such pieces of information of the interchangeable lens assembly including the minimum available F-number, the maximum available F-number, the shortest focal length and the longest focal length are successively stored in the registers REG5, REG6, REG7 and REG8 in the camera body, respectively. An AND gate AN18 serves to determine whether or not the output from the register REG8 in which the data of the longest focal length have been read is "11111", and in the case where the focal length of the interchangeable lens assembly is fixed, a high level pulse emerges from the AND gate AN18. The output terminal of the AND gate AN18 is so connected to the D input terminal of a D flip-flop DF2 that the output from the gate AN18 can be taken in the D flip-flop DF2 in response to the positive edge of the pulse from the output terminal TB2 of the decoder DE1 when the output from the output terminal d6 of the decoder DE2 is in a high level state.

Referring to FIG. 3, when the counter CO6 outputs "111", a high level signal emerges from an AND gate AN26 and, in response to the positive edge of the high level signal from the gate AN26, a one-shot circuit OS7 generates a high level pulse. In response to this high level pulse, the flip-flop FF5 is set, and the Q output of the D flip-flop DF6 is brought into a high level state in response to the positive edge of the high level pulse subsequently fed from the output terminal TL0. Then, an AND gate AN27 is enabled to allow the passage of pulses from the output terminal TL1 therethrough to the counter CO7 on the one hand and to allow the multiplexer MP2 to output such data as have been fed to the input terminals b2. When the Q output from the D flip-flop DF6 is brought into the high level state and the pulse from the output terminal TL1 is subsequently fed to the counter CO7, the counter CO7 outputs "001" and a multiplexer MP1 outputs such data as have been fed to input terminals d1 thereof from a block 10. This block, 10 generates the data corresponding to the displacement of a focusing ring, which is a distance setting member of the interchangeable lens assembly, from the infinity ($\infty$) position. These data are adapted to output four bit data starting from "0000" irrespective of the type of the interchangeable lens assembly. Since these data are applied to the least significant four bits of the input terminals b2 of the multiplexer MP2 and since the output from the counter CO7 is applied to the most significant three bits of the input terminals b2 of the multiplexer MP2, one of the address data "0010000" to "0011111" is outputed from the multiplexer MP2 and is then fed to the ROM R02. IN a territory of the ROM R02 specified by the addresses "0010000" to "0011111", as shown in Table 2, data concerning the focusing distance corresponding to the displacement from the infinity position of the distance setting member of the interchangeable lens assembly are stored. Accordingly, these data are read in the register REG9 in the camera body.

When the output of the counter CO7 subsequently becomes "010", the multiplexer MP1 outputs such data as have been fed to the input terminals a2 thereof from a block 11. This block 11 generates the data corresponding to the number of the positions of an aperture adjusting ring stopped down from the minimum available F-number, which aperture adjusting ring constitutes an aperture setting member of the interchangeable lens assembly. These data are adapted to output four bit data starting from "0000" irrespective of the type of the interchangeable lens assembly. It is, however, to be noted that, in the case of the interchangeable lens assembly having a fixed aperture (for example, a tele-photo lens assembly of mirror reflex type), only the data "0000" are outputed. From the multiplexer MP2, one of the data "0100000" to "0101111" is outputed and is then fed to the ROM R02. In a territory of the ROM R02 specified by the addresses "0100000" to "0101111", as shown in Table 2, data concerning the aperture values corresponding to the number of the positions of the aperture adjusting rings which can be stopped down from the minimum available F-number are provided. Accordingly, the data of the preset aperture value outputed from the ROM R02 are read in the register REG10 in the camera body.

Referring to FIG. 1, when the Q output of the D flip-flop DF2 is in a high level state at the time the data of the preset aperture value are read in the register REG10, that is, when it is determined that the interchangeable lens assembly coupled to the camera body is the one of fixed focal length, an AND gate AN20 is enabled to allow the passage therethrough of the pulse from the output terminal TB2 which emerges from the AND gate AN20 as a read-in completion signal end2, whereby completing the read-in operation. This is because, since the subsequently read-in data are all related to the data on the zoom lens assembly, no read-in operation is required in the case of the lens assembly of a fixed focal length.

Referring to FIG. 3, when the counter CO7 generates an output "011", the multiplexer MP1 outputs such data as have been supplied to the input terminals a3 from a block 12. This block 12 generates the displacement of a zooming ring from the position of the shortest focal length, which zooming ring constitutes a focal length setting member of the zoom lens assembly, and outputs four bit data starting from "0000" as is the case with the blocks 10 and 11. From the multiplexer MP2, one of the data "0110000" to "0111111" from the input terminals b2 is outputed and fed to the ROM R02. At a territory of the ROM R02 specified by the addresses "0110000" to "0111111", as shown in Table 2, the data of the preset focal lengths corresponding to the positions of the focal length setting member are stored, and these data are outputed from the ROM R02 and then read in the register REG11 in the camera body.

When the counter CO7 subsequently generates an output "100", the multiplexer MP1 outputs the same data as have been supplied to the input terminals a3, and one of the data "1000000" to "1001111" is fed to the ROM R02. At a territory of the ROM R02 specified by the addresses "1000000" to "1001111", as shown in FIG. 2 the data $\Delta Av$ of the amount of change in aperture value resulting from the change of the focal length of the zoom lens assembly are stored and, when outputed from the ROM R02, are read in the register REG12 in the camera body.

In the event that the counter CO7 comes to generate an output "101", the multiplexer MP1 generates the same data as have been supplied to the input terminals a3 thereof from the block 12, and one of the data "1010000" to "1011111" is fed to the ROM R02. At a territory of the ROM R02 specified by these data, the data indicating where the preset focal length f of the zoom lens assembly lies between the shortest focal length f min and the longest focal length f max are stored in terms of the percentage showing the position of the preset focal length f spaced from the shortest focal length f min, which percentage is expressed by the following equation:

$$\frac{f - f \min}{f \max - f \min} \times 100\%$$

More specifically, if the percentage falls within 0 to 19%, the output from the ROM R02 will be "00001" which means that the preset focal length of the zoom lens lies in a first zone; if it falls within the range of 20 to 39%, the output will be "00010" which means that the preset focal length lies in a second zone; if it falls within the range of 40 to 59%, the output will be "00100" which means that the preset focal length lies in a third zone; if it falls within the range of 60 to 79%, the output will be "01000" which means that the preset focal length lies in a fourth zone; and if it falls within the range of 80 to 100%, the output will be "10000" which means that the preset focal length lies in a fifth zone.

At the same time as the data indicative of the above described zones are read in the register REG13 in the camera body, a read-in completion signal end3 emerges from an AND gate AN21 and the read-in completion signal end emerges from the OR gate OR3. This read-in completion signal end, which is hereinafter referred to as "end signal", is applied through an OR gate OR2 to the flip-flop FF1 to reset the latter. Accordingly, the read-in start terminal start of an AND gate AN40 is rendered in a low level state with the counters CO1 and CO2 and the D flip-flop DF2 consequently reset. Accordingly, the decoder DE1 ceases generating the timing signal. Similarly, the counters CO3 and CO4 and the D flip-flop DF3, shown in FIG. 2 are reset while the decoder DE3 and the ROM RO1 cease generating their respective outputs. Moreover, the counters CO5, CO6 and CO7 and the D flip-flops DF5 and DF6, shown in FIG. 3 are reset while the decoder DE4 and the ROM R02 cease generating their respective outputs. In this way, the read-in operation is brought to end.

Referring to FIG. 1, where the light measuring switch S1 remains closdd at the time of completion of the read-in operation, the D flip-flop DF1 continues generating a high level signal from the Q output terminal thereof and, therefore, the clock pulses continue to be fed through the AND gate AN1 to the divider DI1 which in turn generate clock pulses of 4 Hz. In response to this 4 Hz clock pulses, a high level pulse emerges from the one-shot circuit OS2, which is in turnapplied through the OR gate OR1 to the flip-flop FF1 to cause the latter to be again reset to render the Q output of the flip-flop FF1 in a high level state, thereby generating the start signal. Thus, so long as the light measuring switch S1 remains closed, the data from the lens adaptor and the interchangeable lens assembly are repeatedly read in at a cycle of 4 Hz.

Although the shift registers SR2 and SR3 have been described as operable to parallelly take in the data from the ROMs R01 and R02 when the output terminals TA7 and TB7 are in a high level state, respectively, and to supply bit by bit these data to the camera body in response to the positive edges of the high level pulses at the output terminals TA0 and TL0, respectively, a specific construction of each of these shift registers is such as follows. Namely, each of the shift registers SR2 and SR3 is so constructed that there is provided a flip-flop, to which the data of each of the bits parallelly fed thereto are preset, for each bit, an output terminal of the flip-flop corresponding to the least significant bit being to connected to an input terminal of the flip-flop corresponding to the next least significant bit that the data preset in each of the flip-flops can be sequentially shifted from the least significant bit to the most significant bit in synchronism with the clock pulses. In addition, separately of the above described flip-flops, another flip-flop is employed with its input terminal so connected to the output terminal of the flip-flop corresponding to the most significant bit that the above described data taken in can be, after having been delayed a time corresponding to one clock pulse, outputed from such another flip-flop.

In the foregoing description, the start signal has been described as outputed from the flip-flop FF1 upon closure of the light measuring switch S1. However, an alternative method is possible. Namely, a current flowing through the power line +V activated upon closure of the switch S1 may be used as the start signal and, in this case, the start signal may be transmitted to the accessory through the terminal JB1. It is to be noted that the timing at which the start signal is generated may not be limited to the timing at which the light measuring switch S1 is closed, but may be at any time prior to the time at which the photographic exposure takes place in the camera system. It is also to be noted that, although the circuit arrangement according to this invention has been shown and described as constituted by a logic circuit in the foregoing embodiment, it may be substituted by a so-called microprocessor (CPU) so that the operation can sequentially be controlled.

Hereinafter, one of the setting members which have schematically been shown in the form of the respective blocks 10, 11 and 12 in FIG. 3, for example, the aperture adjusting ring, will be described in detail th reference to FIG. 4.

Figure 4:
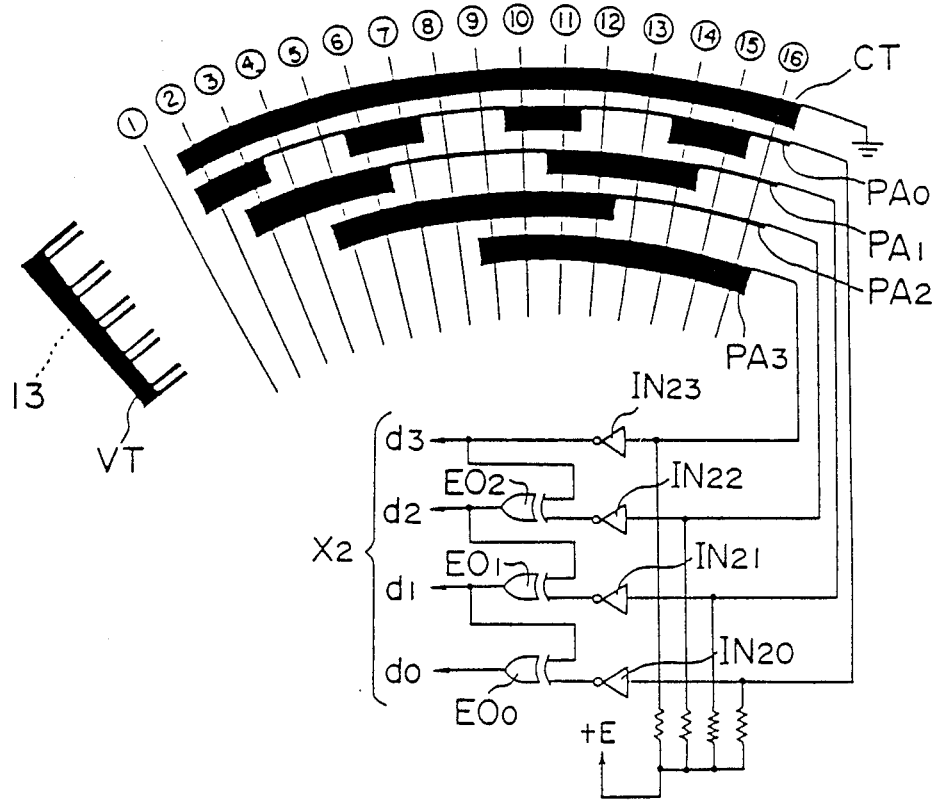
FIG. 4 is a schematic diagram showing a data setting member together with an associated electric circuit.

FIG. 4 illustrates a circuit diagram showing the construction of the setting member. Referring to FIG. 4, a slide VT can be moved together with the aperture adjusting ring 13 provided on the lens assembly to any one of the click positions shown respectively by (1) to (16) and corresponding to the associated positions of the aperture adjusting ring 13. A patterned conductive strip CT is electrically grounded while the other patterned conductive strips PA0, PA1, PA2 and PA3 are connected to the power line +E through respective resistors. Accordingly, depending on the position of the slide VT, some or all of the conductive strips PA0 to PA3 are selectively short circuited through the slide VT to the conductive strip CT and, therefore, some or all of the inverters IN20 to IN23 connected with the conductive strips PA0 to PA3, respectively, selectively generate a high level output. Where the slide VT is held in position clear from any one of the conductive strips PA0 to PA23, all o the inverters IN20 to IN23 generate a low level output. The inverter IN23 is in turn connected to an output d3 and also to one of the input terminals of an exclusive OR gate EO2. The inverter IN22 is in turn connected to the other of the input terminals of the exclusive OR gate EO2 having its output connected to an output terminal d2 and also to one of the input terminals of an exclusive OR gate EO1. The inverter IN21 is in turn connected to the other of the input terminals of the exclusive OR gate EO1 having its output connected to an output terminal d1 and also to one of the input terminals of an exclusive OR gate EO0. The inverter IN20 is in turn connected to the other of the input terminals of the exclusive OR gate EO0 having its output connected to an output terminal d0.

The conductive strips PA0 to PA3 are gray-coded, and the relationship between the inputs to the inverters IN20 to IN23 and the outputs at the respective output terminals d0 to d3 depending on the position of the slide VT according to the code is tabulated in Table 5 together with the step-down number at each position of the slide VT.

TABLE 5

| Position | Inputs | | | | Outputs | | | | Stop-down Number |
|---|---|---|---|---|---|---|---|---|---|
| | IN23 | IN22 | IN21 | IN20 | d3 | d2 | d1 | d0 | |
| (1) | 0 | 0 | 0 | 0 | 0 | 0 | 0 | 0 | 0 |
| (2) | 0 | 0 | 0 | 1 | 0 | 0 | 0 | 1 | 0.5 |
| (3) | 0 | 0 | 1 | 1 | 0 | 0 | 1 | 0 | 1 |
| (4) | 0 | 0 | 1 | 0 | 0 | 0 | 1 | 1 | 1.5 |
| (5) | 0 | 1 | 1 | 0 | 0 | 1 | 0 | 0 | 2 |
| (6) | 0 | 1 | 1 | 1 | 0 | 1 | 0 | 1 | 2.5 |
| (7) | 0 | 1 | 0 | 1 | 0 | 1 | 1 | 0 | 3 |
| (8) | 0 | 1 | 0 | 0 | 0 | 1 | 1 | 1 | 3.5 |
| (9) | 1 | 1 | 0 | 0 | 1 | 0 | 0 | 0 | 4 |
| (10) | 1 | 1 | 0 | 1 | 1 | 0 | 0 | 1 | 4.5 |
| (11) | 1 | 1 | 1 | 1 | 1 | 0 | 1 | 0 | 5 |
| (12) | 1 | 1 | 1 | 0 | 1 | 0 | 1 | 1 | 5.5 |
| (13) | 1 | 0 | 1 | 0 | 1 | 1 | 0 | 0 | 6 |
| (14) | 1 | 0 | 1 | 1 | 1 | 1 | 0 | 1 | 6.5 |
| (15) | 1 | 0 | 0 | 1 | 1 | 1 | 1 | 0 | 7 |
| (16) | 1 | 0 | 0 | 0 | 1 | 1 | 1 | 1 | 7.5 |

Hereinafter, the relationship between the preset F-number and the selected position of the slide VT will be described. In the case of the lens assembly having an F-number range of F1.2 to F16, if the aperture adjusting ring is set at F1.2 (Av=0.5), the slide VT is held at the position (1) and the data "0000" indicating that the stop-down number is zero are outputed from the output terminals d3 to d0. On the other hand, if it is set at F1.4 (Av=1), the slide VT is held at the position (2) and the data "0001" indicating that the stop-down number is 0.5 are outputed from the output terminals d3 to d0. Similarly, if it is set at F13 (Av=7.5), the data "1110" indicating that the stop-down number is 7 are outputed from the output terminals d3 to d0 and, if it is set at F16, the data "1111" indicating that the stop-down number is 7.5 are outputed from the output terminals d3 to d0.

Figure 5:
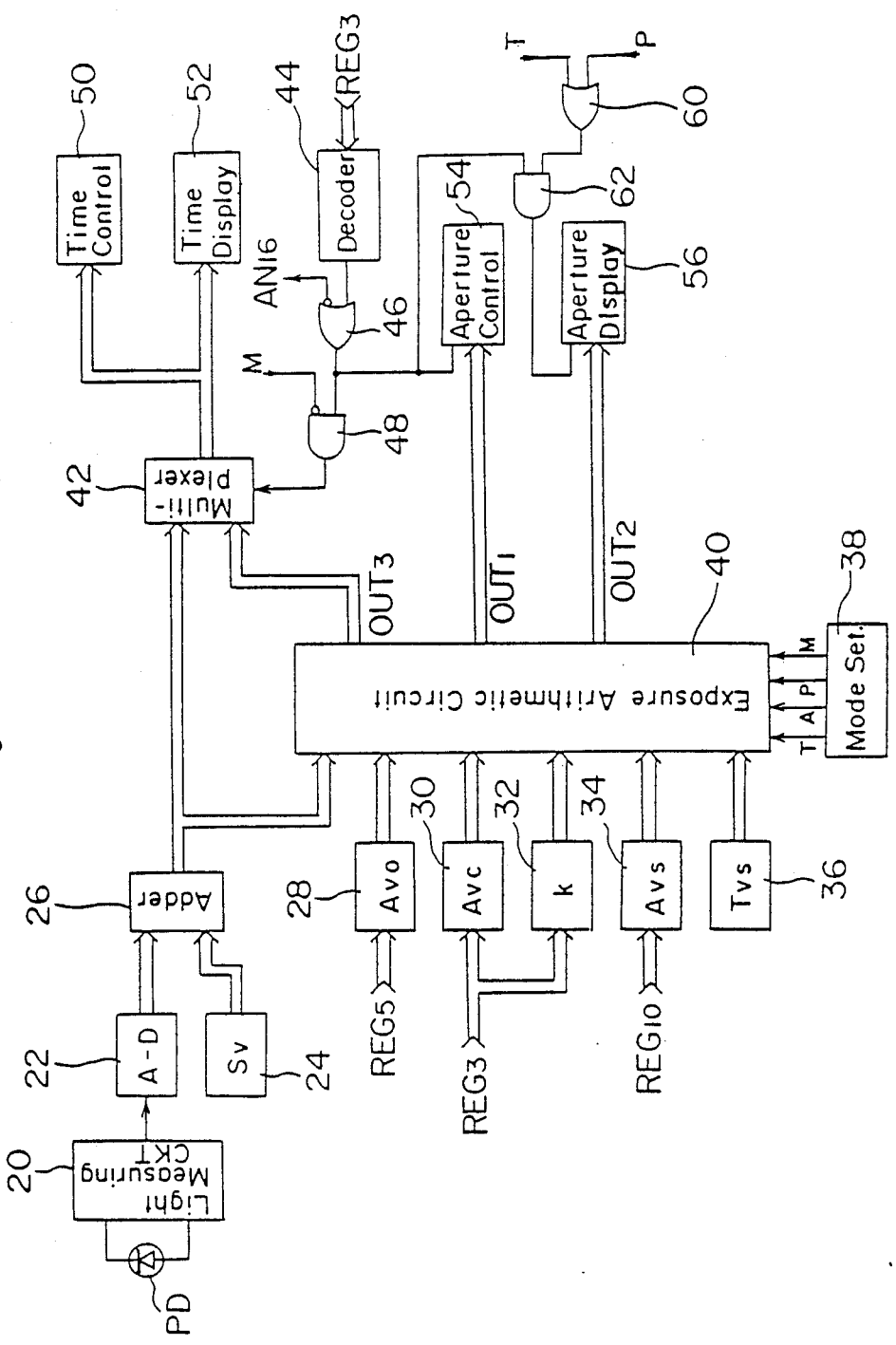
FIG. 5 is a circuit block diagram showing an exposure control unit incorporated in the camera body.

FIG. 5 illustrates a block circuit diagram showing the exposure control unit for effecting an exposure control on the basis of the data read in the camera body. In the circuit arrangement shown in FIG. 5, both a countermeasure against the possibility that the interchangeable lens assembly has not been coupled to the camera body or the interchangeable lens assembly is of a type having no automatic aperture setting mechanism and a countermeasure against any possible change of the effective aperture (i.e., reduction of the preset aperture) resulting from the use of the lens adaptor are taken.

Referring to FIG. 5, a light measuring circuit 20 is adapted to receive an output signal from a photosensor PD which measure the amount of light reflected from a target object to be photographed and then impinging thereupon through the lens assembly, and an output from the circuit 20 is subjected to an analog-to-digital conversion in an A-D converter 22. Assuming that the brightness of the object to be photographed is expressed by Bv, the minimum F-number is expressed by Avo, the amount of change of the aperture resulting from the use of the lens adaptor is expressed by k, and the restricted aperture, that is, the aperture which has been restricted by the use of the lens adaptor because the bore size of the lens adaptor is limited, is expressed by Avc, the above described output will represent the difference $Bv-(Avo+k)$ if $Avo+k>Avc$ or $Bv-Avc$ if $Avo+k\leq Avc$. Where the lens adaptor of a type having no capability of transmitting aperture information between the lens assembly and the camera body is used or where the interchangeable lens assembly has not been coupled to the camera body, the above described output will represent the difference $Bv-Avn$, wherein Avn corresponds to the actual aperture value given when the lens assembly has been stopped down or the aperture value when the lens assembly has not been coupled to the camera body. Where only the lens assembly is used, i.e., coupled to the camera body, it will represent the difference $Bv-Avo$.

The relationship between $Avo+k$ and Avc will be described in detail. By way of example, assuming that a tele-converter is coupled as the lens adaptor to the lens assembly having an F-number range of F1.4 (Avo=1) to F16 (Avmax=8) and the effective aperture of the lens assembly is accordingly stopped down one position, the effective F-number range will be F2 (Av=2) to F22 (Av=9). In the event that the minimum F-number of the lens assembly is restricted to, for example, F4 (Av=4) because of the tele-converter having been coupled to such a lens assembly, the effective F-number range of the lens system including the lens assembly and the tele-converter will be F4 to F22 and the F number range from F1.4 to F4 ($1 \leq Av < 4$) can no longer be utilized. Similarly, where the lens assembly having the F-number range from F3.6 (Avo=3.5) to F22 (Avmax=9) is used in combination with the above described tele-converter, the effective F-number range of the lens system is F4.5 (Av=4.5) to F32 (Av=10) and, since the restricted aperture value resulting from the use of the tele-converter is F4 (Av=4), the whole F-number range of the lens assembly can be effectively utilized.

Reference numeral 24 represents a data output device from which data Sv of the preset film speed is outputed, and an adder 26 performs one of the following calculations based on the data fed from both the A-D converter 22 and the data output device 24:

$$Bv-(Avo+k)+Sv=Ev-(Avo+k)$$

$$Bv-Avc+Sv=Ev-Avc$$

$$Bv-Avn+Sv=Ev-Avn$$

$$Bv-Avo+Sv=Ev-Avo$$

The data calculated in the adder 26 is fed to both an exposure arithmetic circuit 40 and a multiplexer 42.

The exposure arithmetic circuit 40 also receives the data from decoders 28, 30, 32 and 34. The decoder 28 is operable to convert the data of the minimum F-number of the lens assembly fed from the register REG5 (FIG. 1) into processable data Avo which are in turn outputed to the exposure arithmetic circuit 40. The decoder 30 is operable to feed the data Avc of the restricted aperture resulting from the use of the accessory, based on the data of the type of the accessory fed from the register REG3, to the circuit 40. The decoder 32 is operable to feed to the circuit 40, the data k of the amount of change of the aperture as a result of the use of the accessory based on the type of the accessory fed from the register REG3. The decoder 34 is operable to convert the data of the preset aperture value fed from the register REG10 (FIG. 1) into processable data Avs which are in turn outputed to the circuit 40. Reference numeral 36 represents a data output device for outputting data Tvs of a preset exposure time to the circuit 40. Reference numeral 38 represents a mode setting device having a plurality of output terminals all connected to the exposure arithmetic circuit 40. This mode setting device 38 is operable in such a manner that, in the case of the shutter speed priority mode (hereinafter referred to as "T-priority mode") in which the aperture of the lens assembly can automatically controlled according to the preset exposure time, the preset film speed and the brightness of the target object, the output terminal T is rendered in a high level state; in the case of the aperture priority mode (hereinafter referred to as "A-priority mode") in which the exposure time can be automatically controlled according to the preset aperture value (F-number), the preset film speed and the brightness of the target object, the output terminal A is rendered in a high level state; in the case of the programed control mode (hereinafter referred to as "P-mode") in which both the exposure time and the apertue can automatically be controlled according to the preset film speed and the brightness of the target object, the output terminal P is rendered in a high level state; and in the case of the manual control mode (hereinafter referred to as "M-mode") in which both the exposure time and the aperture can manually be controlled, the output terminal M is rendered in a high level state. Since these output terminals T, A, P and M are connected to the exposure arithmetic circuit 40, the exposure arithmetic circuit 40 performs an arithmetic calculation under one of the modes assigned by one of the mode designating signals which has been fed from the mode setting device 38. This circuit 40 has three output terminals OUT1, OUT2 and OUT3. The output terminal OUT1 feeds the data for the aperture control to an aperture control device 54, the output terminal OUT2 feeds the data for the aperture display to an aperture display device 56, and the output terminal OUT3 feeds the data for the exposure time control and the exposure time display to an exposure time control device 50 and an exposure time display device 52, respectively, through the multiplexer 42.

Hereinafter, the arithmetic calculation performed by the exposure arithmetic circuit 40 according to the different modes will be described with particular reference to the flow chart shown in FIG. 6.

Figure 6:
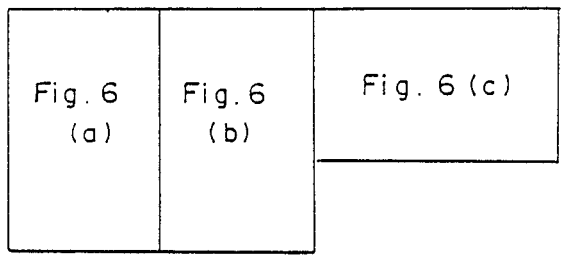
FIG. 6 composed of FIGS. 6(a), 6(b) and 6(c) is a flow chart showing the sequence of arithmetic calculation performed by an exposure arithmetic circuit used in the circuit of FIG. 1.
Figure 6A:
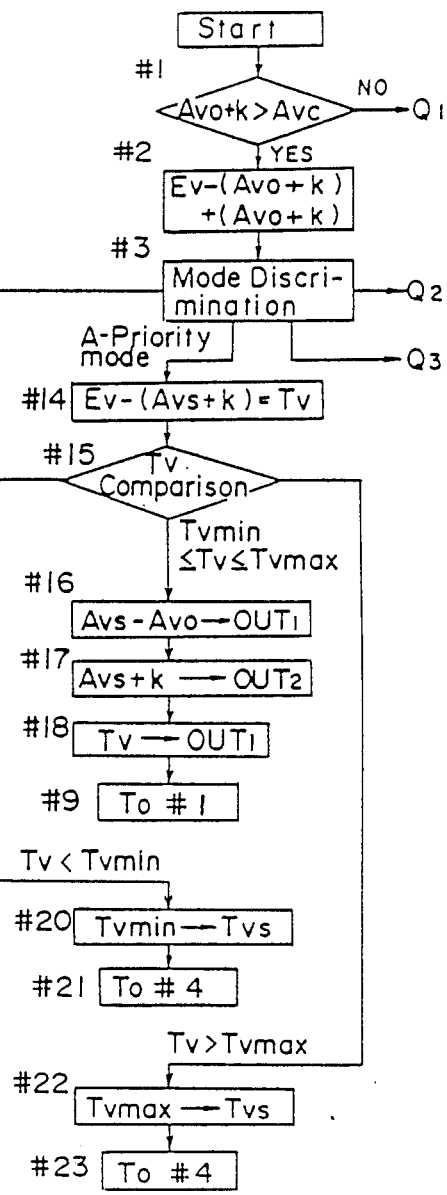

Referring now to FIG. 6, particularly to FIG. 6(a), at the step #1, the minimum aperture value $Avo+k$ based on the change in aperture resulting from the use of the lens adaptor is compared with the restricted aperture value Avc resulting from the use of the lens adaptor. If $Avo+k \geq Avc$, the process proceeds to the step #, but if $Avo+k \leq Avc$, the process proceeds to the step #38 shown in FIG. 6(b). Where the process proceeds to the step #2, the data fed from the adder 26 to the arithmetic circuit 40 represent $Ev-(Avo+k)$ and, therefore, the equation, $Ev-(Avo+k)+(Avo+k)=Ev$, is calculated at the step #2 to give an exposure value Ev which is not affected by the minimum aperture value $Avo+k$.

At the subsequent step #3, the mode discrimination is carried out depending on which one of the mode designating signals is fed from the mode setting device 38 through the corresponding output terminal T, A, P or M. The process proceeds to the step #4 in the case of the T-priority mode; to the step #14 in the case of the A-priority mode; to the step #24 (FIG. 6(b)) in the case of the P-mode; and to the stp #34 (FIG. 6(b) in the case of the M-mode.

Assuming that the mode designating signal is fed through the output terminal T from the mode setting device 38, the equation, $Ev-Tvs=Ave$, is calculated at the step #4 and, then, the effective aperture value Ave is compared with $Avo+k$ and $Avmax+k$ at the step #5. If $Avo+k \leq Ave \leq Avmax+k$, it is possible to control to the effective aperture value Ave, and at the step #6, the stop-down number, that is, $(Ave-k)-Avo$, is calculated and, thereafter, the data indicative of the stop-down number are outputed to the output terminal OUT1. These data are fed to the aperture control device 54. When the aperture is stopped down according to this value, although the aperture value is $Ave-k$ when only the lens assembly is used, the effective aperture value is Ave becomes the use of the lens adaptor results in the aperture being stopped down by k. In addition, the data Ave of the effective aperture value calculated at the step #4 is outputted to the output terminal OUT2 at the step #7, which in turn is displayed through the aperture display device 56. It the step #8, the data Tvs of the preset exposure time is outputed to the output terminal OUT3. The process then returns to the step #1 to complete a cycle which is repeated until the shutter release is performed.

However, if $Ave < Avo+k$ is found at the step #5, since it is not possible to control the aperture to the effective aperture value Ave, the A-priority mode is initiated at the step #14, using the data of Avo as the data of the preset aperture value. Moreover, even if $Ave > Avmax+k$ is found at the step #5, it is not possible to control the aperture and, therefore, the A-priority mode is initiated at the step #14, using Avmax as the preset aperture value.

It is to be noted that, if the exposure time determined on the basis of the value Avo or Avmax which is newly determined when the $Ave<Avo+k$ or $Ave>Avmax+k$ has been found does not fall within the controllable exposure time range of $Tv=Tvmin$ (the shortest exposure time) to $Tv=Tvmax$ (the longest exposure time), any photo-taking at a proper exposure can no longer be carried out. In such case, it is desirable to cause the exposure control to take place using the effective aperture value of $Avo+k$ and the exposure time of Tvmax and then to carry out a warning to inform the photographer of an under-exposure condition or to cause the exposure control to take place using the effective aperture value of $Avmax+k$ and the exposure time of Tvmax and then to carry out a warning to inform the photographer of an over-exposure condition.

The A-priority mode will now be described. At the step #14, the equation, $Ev-(Avs+k)=Tv$, is calculated. $Avs+K$ represents, as hereinbefore described, the effective aperture value obtained when the aperture of the lens assembly has been controlled to Avs. At the subsequent step #15, the data Tv of the exposure time so calculated is discriminated as to whether it falls within the controllable range and, if $Tvmin \leq Tv \leq Tvmax$, the data indicative of the stop-down number represented by $Avs-Avo$ are fed from the output terminal OUT1 to the aperture control device 54, the data indicative of the effective aperture value represented by $Avs+k$ are fed from the output terminal OUT2 to the aperture display device 56 and the data Tv indicative of the exposure time are fed to both of the exposure time control device 50 and the exposure time display device 52. Thereafter, the process returns to the step #1. On the other hand, if $Tv>Tvmax$ has been found at the step #15, the T-priority mode is initiated using Tvmax as the preset value. Even in this case, if $Avs=Avmax$ is determined, it is desirable to carry out a warning informing the photographer of an over-exposure condition while the exposure is controlled on the basis of Avmax and Tvmax.

Figure 6B:
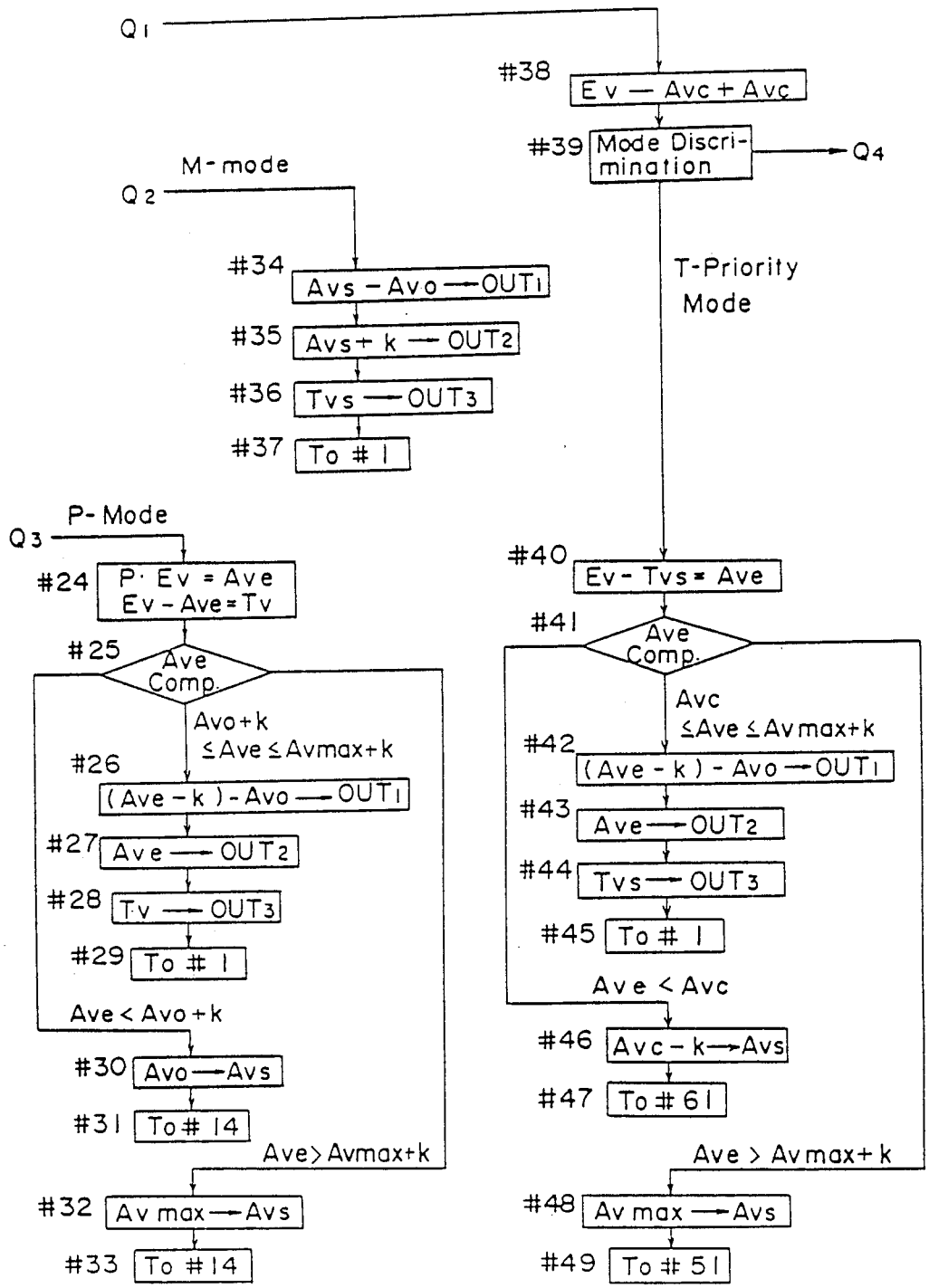

The P-mode starting from the step #24 will now be described with particular reference to FIG. 6(b). At the step #24, the following calculations are performed:

$$P \cdot Ev = Ave \quad (0<P<1)$$
$$Ev - Ave = Tv$$

and, subsequently, the value Ave is discriminated as to whether or not it falls within the controllable range. If $Avo+k \leq Ave \leq Avmax+k$, the data of the stop-down number represented by $(Ave-k)-Avo$ is outputed to the output terminal OUT1. As is the case with that during the T-priority mode, these data represent the stop-down number by which the aperture in the lens assembly should be stopped down, since they are the effective aperture value Ave so calculated. Thereafter, the data Ave of the effective aperture value and the data of the calculated exposure time are respectively fed to the output terminals OUT2 and OUT3 and the process returns to the step #1. Where $Ave < Avo+k$, Avo is set as the data of the preset aperture value at the step #30 and the A-priority mode is initiated starting from the step #14. Conversely, where $Ave>Avmax+k$, Avmax is set as the data of the preset exposure time and the A-priority mode is initiated starting from the step #14.

In the case of the M-mode, the data $Avs-Avo$ of the stop-down number based on the preset aperture value Avs, the effective aperture value $Avs+k$, and the data Tvs of the preset exposure time are respectively outputed to the output terminals OUT1, OUT2 and OUT3 and the process then returns to the step #1.

Where $Avo+k \leq Avc$ has been determined at the step #1, since the data fed from the adder 26 to the arithmetic circuit 40 at this time represent $Ev-Avc$, the following equation is calculated at the step #38:

$$(Ev-Avc)+Avc=Ev$$

At the subsequent step #39, the exposure control mode is discriminated.

In the case of the T-priority mode, $Ev-Tvs=Ave$ is calculated at the step #40 and, then, Ave is discriminated as to whether or not it falls within the controllable range. If $Avc \leq Ave \leq Avmax+k$, the data of $(Ave-k)-Avo$, Ave and Tvs are respectively outputed to the output terminals OUT1, OUT2 and OUT3 in a manner similar to the previously described T-priority mode and the process then returns to the step #1. If $Ave<Avc$, the A-priority mode starting from the step #61 is initiated using $Avc-k$ as the preset aperture value. It is, however, to be noted that, since a proper exposure can not be obtained when Tvs=Tvmin at this time, it is desirable to effect a warning to in form the photographer of an under-exposure condition and to effect the exposure control using Avc−k and Tvmin as the respective preset values. On the other hand, if Ave>Avmax+k, the A-priority mode starting from the step #51 is initiated using Avmax as the preset aperture value. Even in this case, if Tvs=Tvmax, it is desirable to effect a warning to inform the photographer of an over-exposure condition and to effect the exposure control using Avmax and Tvmax as the respective preset values.

Figure 6C:
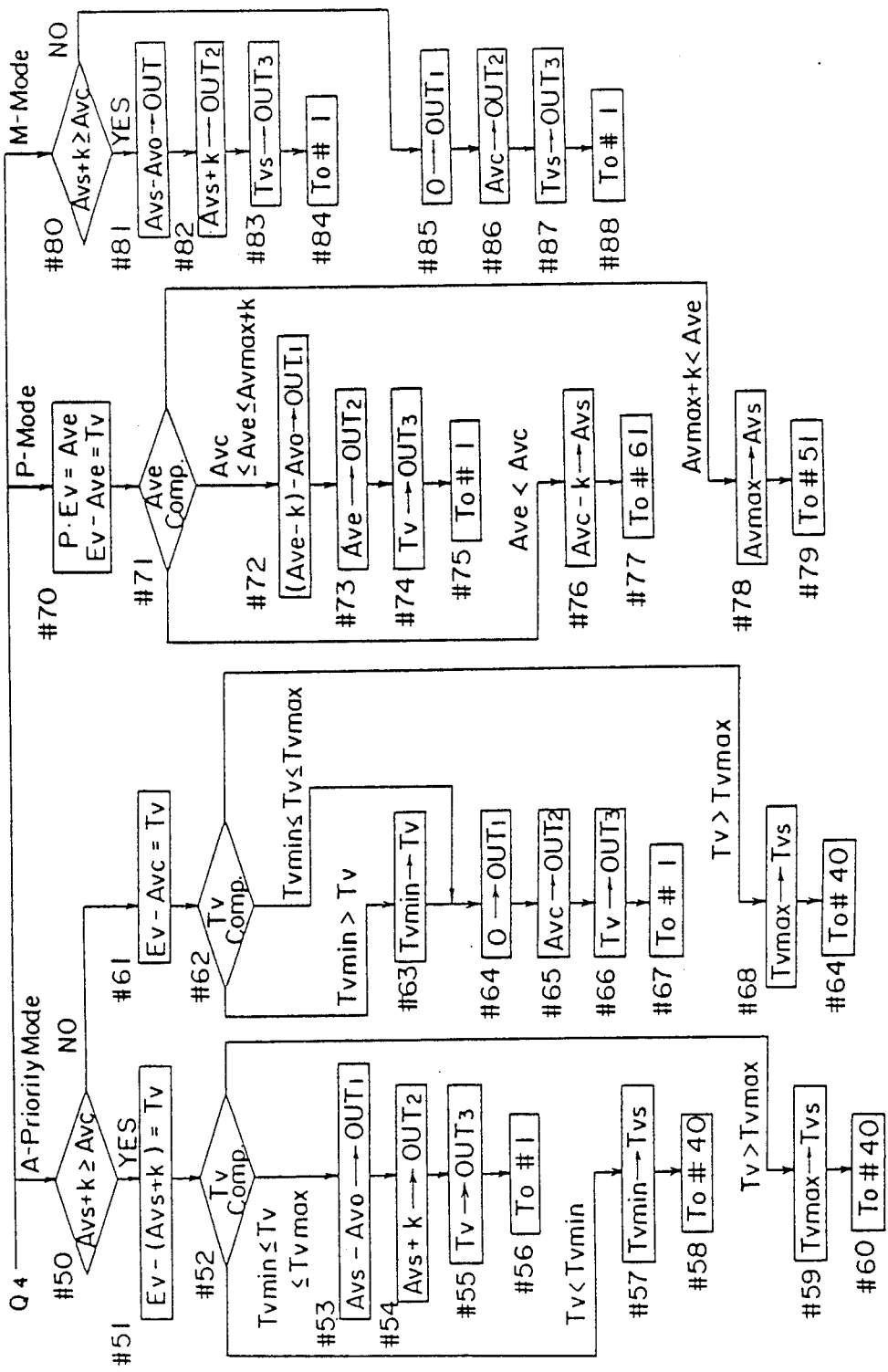

Referring particularly to FIG. 6(c), the operation under the A-priority mode starting from the step #50 will now be described. If Avs+k≦Avc is determined at the step #50, Ev−(Avs+k)=Tv is calculated and, then, Tv is discriminated as to whether or not it falls within the controllable range. Where Tvmin≦Tv≦Tvmax, the data of Avs-Avo, Avs+k, and Tv are respectively outputed to the output terminals OUT1, OUT2 and OUT3 and the process then returns to the step #1. Where Tv<Tvmin, the T-priority mode starting from the step #40 is initiated using Tvmin as the preset exposure time, whereas where Tv>Tvmax, the T-priority mode starting from the step #40 is initiated using Tvmax as the preset exposure time. It is, however, desirable to effect a warning to inform the photographer of an over-exposure condition and to effect the exposure control at Avmax and Tvmax, if Avs=Avmax.

Where Avs+k<Avc is found at the step #50, the process starts from the step #61. In this case, since the effective aperture value determined by the preset aperture value of the lens assembly is smaller than the restricted aperture value resulting from the use of the lens adaptor, the actual effective aperture value will be Avc. At this time, Avc is set as the effective aperture value and, then, Ev−Avc=Tv is calculated. Thereafter, Tv is discriminated as to whether or not it falls within the controllable range.

Where Tvmin≦Tv≦Tvmax, the process proceeds to the step #64 and the data indicating that the stop-down number is zero, the data of the effective aperture value Avc, and the data Tv of the exposure time are respectively outputed to the output terminals OUT1, OUT2 and OUT3. Thereafter, the process returns to the step #1. However, where Tv≦Tvmin, since the preset effective aperture value is the minimum aperture value Avc, a proper exposure cannot be obtained and, in such case, after Tvmin is set as the calculated value at the step #63, the process proceeds to the step #64. Even in this case, it is desirable to effect a warning to inform the photographer of an under-exposure condition. On the other hand, where Tv>Tvmax, the T-priority mode starting from the step #40 is initiated using Tvmax as the preset value.

In the case of the P-mode, the following equations are calculated at the step #70:

$$P \cdot Ev = Ave$$

$$Ev - Ave = Tv$$

Thereafter, the process proceeds in a manner similar to that during the T-priority mode starting from the step #40.

In the case of the M-mode, if Avs+k≧Avc is found at the step #80, the process starting from the step #81 is performed and the data of the stop-down number Avs−Avo, the effective aperture value Avs+k, and the exposure time Tvs are respectively outputed to the output terminals OUT1, OUT2 and OUT3. Thereafter, the process returns to the step #1. However, where Avs+k<Avc, the process proceeds from the step #80 to the step #85 and the data of the stop-down number being zero, the effective aperture value Avc and the exposure time Tvs are outputed respectively to the output terminals OUT1, OUT2 and OUT3. Thereafter, the process returns to the step #1.

It is to be noted that, where only the interchangeable lens assembly is mounted on the camera body, the output from the register REG3 shown in FIG. 1 is "00000" and the data of the light measured represent Bv−Avo. In such case, the ordinary arithmetic operation shown and described with reference to the flow chart of FIG. 6 can be performed if arrangement is made to enable the decoders 30 and 32 to output the respective data of Avc=0 and k=0.

Referring back to FIG. 5, a decoder 44 is operable on the basis of the data of the type of the lens adaptor fed from the register REG3 to determine whether or not the lens adaptor is of an auto-aperture control type having a capability of transmitting physical aperture control information between the camera body and the lens assembly therethrough. When the data "01001", "01010", "01011" and "01100" as shown in Table 3 indicating that the accessory is not of the auto-aperture control type are fed to the decoder 44, the output from the decoder 44 is rendered in a high level state. However, when the data indicating that the accessory is of the auto-aperture control type are fed thereto, the output from the decoder 44 is in a low level state. In addition, where no lens assembly is mounted on the camera body and, therefore, the data of "11100" for the check code are not fed to the register REG4, the AND gate AN16 generates a low level output and the input to an OR gate 46 is brought in a high level state. Accordingly, in the event that either the lens adaptor having no auto-aperture control linkage is used or the interchangeable lens assembly is not coupled, the OR gate 46 generates a high level output. Since any aperture control need not be effected in this case, this output is a. d to the aperture control device 54 to bring the latter to an inoperative condition. In addition, since any display need not be effected other than when the preset aperture value is to be displayed, in the case of the T-priority mode and P-mode in which the aperture is automatically controlled, an AND gate 62 generates a high level signal upon receipt of respective outputs from the OR gate 46 and an OR gate 60, the output from the gate 62 being in turn fed to the aperture display device 56 to bring the latter to an inoperative condition.

With respect to the exposure time, where the lens adaptor is of a type having no auto-aperture control linkage, the output from the OR gate 46 is in the high level state, and the mode selected is other than the M-mode (i.e., the output terminal M is in a low level state), an AND gate 48 generates a high level signal. This high level signal is in turn applied to a selection terminal SE of the multiplexer 42 and, in this case, the data of Ev−Avn fed from the adder 26 and based on the amount of light which has been reflected from the target object and measured after having passed through the aperture than manually preset, that is, the amount of light measured according to the stop-down measuring system, are outputed from the multiplexer 42 in the form as supplied from the adder 26. Then, these data are displayed by the display device 52 as a proper exposure time and, moreover, based on these data, the exposure time is controlled by the exposure time control device 50. That is to say, the aperture priority, automatic exposure time control mode with stop-down metering system is established. On the other hand, where the mode selected is the M-mode (that is, the output terminal M is in a high level state) while the output from the OR gate 46 is in a high level state, the AND gate 48 generates a low level signal. In this case, the multiplexer 42 outputs the data of the preset exposure time Tvs in the form as fed from the arithmetic circuit 40 and, accordingly, the display is controlled on the basis of these data Tvs. Where the output from the OR gate 46 is in a low level state, the display is controlled on the basis of the data fed from the arithmetic circuit 40.

Figure 7:
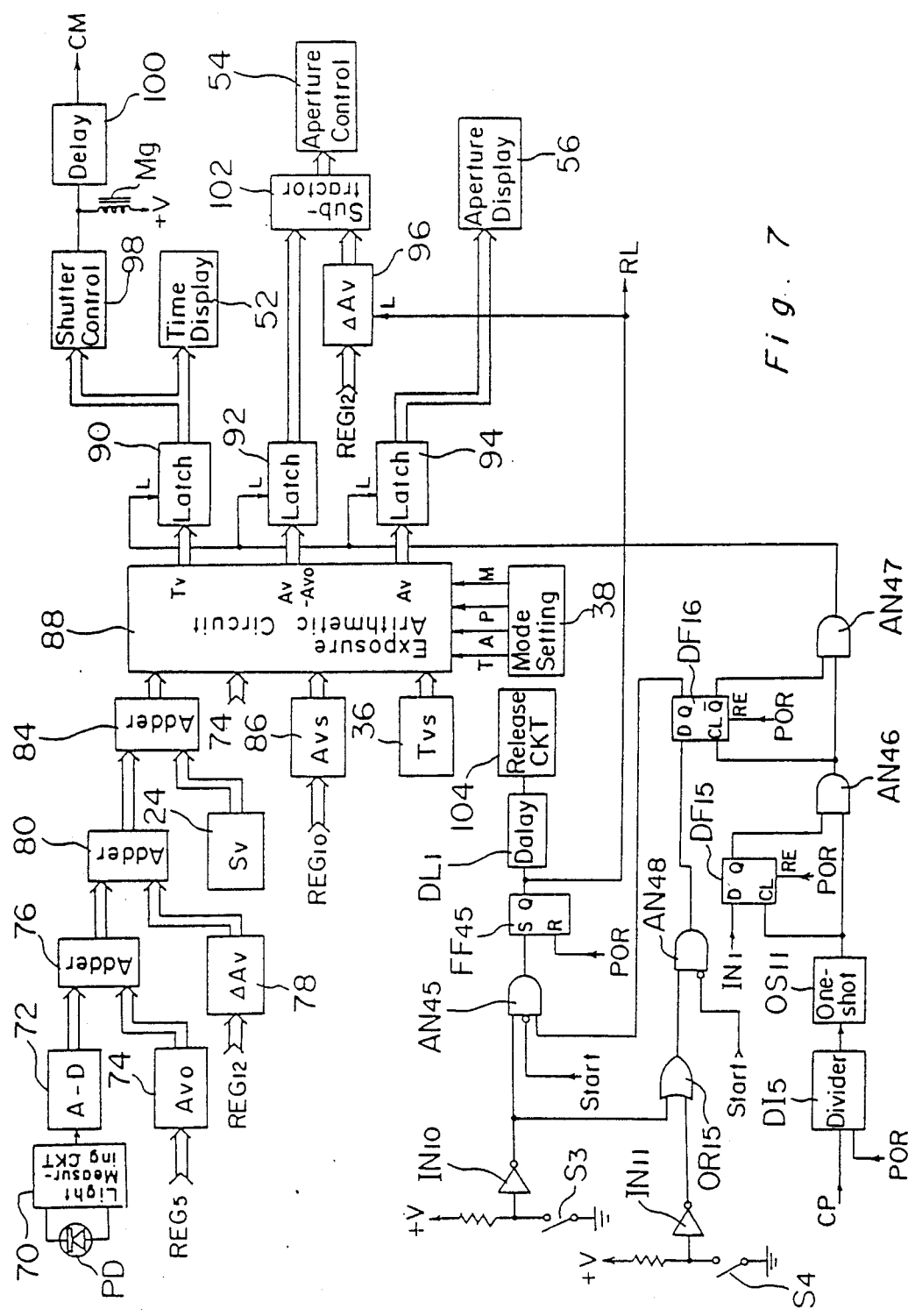
FIG. 7 is a circuit block diagram showing an exposure control unit incorporated in the camera body.

FIG. 7 illustrate a circuit block diagram showing an exposure control unit incorporated in the camera body and operable to effect an AE lock photography based on the data corresponding to the amount of error in the aperture read in a read-in unit in the camera body. Reference character PD represents a photosensor positioned adjacent, for example, the plane at which a film is located and operable to effect a TTL light measurement, that is, to measure the intensity of light reflected from the target object and then passed through the lens assembly. Reference numeral 70 represents a light measuring circuit operable to output an analog signal, the level of which corresponds to the intensity of light detected by the photosensor PD. Reference numeral 72 represents an analog-to-digital converter for converting the analog signal, fed from the circuit 72, into a digital signal. The digital signal emerging from the converter 72 includes the amount of error $\Delta Av$ of the aperture of the zoom lens assembly as a phototaking lens assembly and, therefore, represents $Bv - \Delta Av - Avo$. Reference numeral 74 represents a decoder for converting the data of the minimum aperture value (the minimum F-number), which have been fed from the register REG5 shown in FIG. 5, into data Avo for arithmetic calculation. An adder 76 is operable to add the data from the decoder 74 and those from the converter 72 together as shown by the following equation:

$$(Bv - \Delta Av - Avo) + Avo = Bv - \Delta Av$$

Reference numeral 78 represents a decoder for converting the data corresponding to the amount of error of the aperture, which have been fed from the register REG12 (FIG. 1), into data $\Delta Av$ for the arithmetic calculation, and an adder 80 performs a calculation of $(Bv - \Delta Av) + \Delta Av = Bv$ on the basis of the data $\Delta Av$ and the data $(Bv - \Delta Av)$ fed respectively from the decoder 78 and the adder 76, thereby counterbalancing the data corresponding to the amount of error of the aperture. Reference numeral 24 represents a data output circuit for generating data Sv corresponding to the film speed set by a film speed setting member (not shown) incorporated in the camera body, and an adder 84 performs a calculation of $Bv + Sv = Ev$ on the basis of the data Sv and the data Bv fed respectively from the data output circuit 24 and the adder 80. In this way, the proper exposure value Ev which is not affected by the amount of error of the aperture can be fed to an exposure arithmetic circuit 88. In the case where the photo-taking lens assembly is not a zoom lens assembly, but a lens assembly of fixed focal length, since the amount of error of the aperture of such lens assembly, is zero, the output from the converter 16 represents $Bv - Avo$, and since the register REG12 shown in FIG. 1 remains reset by the power-on reset signal POR, the decoder 78 outputs the data indicating that the amount of error of the aperture is zero.

Reference numeral 86 represents a decoder for converting the data of the preset aperture value, fed from the register REG10 shown in FIG. 1, into data Avs for the arithmetic calculation, and reference numeral 36 represents a data output circuit for outputting data Tvs corresponding to the exposure time set by an exposure time setting member (not shown) incorporated in the camera body. The exposure arithmetic circuit 88 is operable to perform an arithmetic calculation in accordance with the exposure value Ev from the adder 84, the minimum aperture value Avo from the decoder 74, the present aperture value Avs from the decoder 86, the present exposure time Tvs from the data output circuit 36, and the mode designating signal from the exposure control mode setting device 38 as will be described later. This mode setting device 38 has four output terminals T, A, P and M corresponding to the four available exposure control modes, which terminals are in turn connected to the arithmetic circuit 88 and selectively feed the high level mode designating signal to the circuit 88 depending on which one of the control modes has been selected. That is, when the T-priority mode in which the aperture is automatically controlled according to the preset exposure time is selected, the output terminal T is brought in a high level state; when the A-priority mode in which the exposure time is automatically controlled according to the present aperture is selected, the output terminal A is brought in a high level state; when the P-mode in which both the exposure time and the aperture are automatically controlled according to a programed combination of these parameters, is selected, the output terminal P is brought in a high level state; and when the M-mode in which both the exposure time and the aperture are manually controlled is selected, the output terminal M is brought in a high level state.

The arithmetic circuit 88 performs the following calculation when the output terminal T is in a high level state:

$$\left. \begin{array}{l} Ev - Tvs = Av \\ Av - Avo \end{array} \right\} \quad (7)$$

It performs the following calculation when the output terminal A is in a high level state:

$$\left. \begin{array}{l} Ev - Avs = Tv \\ Avs - Avo \end{array} \right\} \quad (8)$$

When the output terminal P is in the high level state, it performs the following calculation:

$$\left. \begin{array}{l} P \cdot Ev = Av \\ Av - Avo \\ Ev - Av = Tv \end{array} \right\} \quad (9)$$

However, when the output terminal M is in a high level state, it performs the following calculation.

$$Avs - Avo \quad (10)$$

From the arithmetic circuit 88, the data Tv of the preset or calculated exposure time, the data Av−Avo of the calculated stop-down number, and the data Av of the preset or calculated aperture value are fed to latch circuits 90, 92 and 94, respectively.

A divider DI5 is adapted to be reset by the power-on reset signal POR generated in response to the closure of the light measuring switch S1 and to receive the clock pulses CP from the oscillator PG shown in FIG. 1. This divider DI5 is operable to generate pulses at a predetermined cycle, for example, 16 Hz, upon receipt of the clock pulses from the oscillator PG, which are in turn fed to one-shot circuit OS11. The one-shot circuit OS11 generates a high level pulse in response to the positive edge of the pulse of the predetermined cycle from the divider DI5.

A D flip-flop DF15 is reset by the power-on reset signal POR and, when and so long as the light measuring switch S1 remains closed, generates a high level signal from its Q output terminal in response to the positive edge of the pulse from the one-shot circuit OS11 since the output from the inverter IN1 (FIG. 1) is in the high level state at this time. An AND gate AN46 is enabled in response to this high level signal to allow the pulses of the predetermined cycle from the one-shot circuit OS11 to pass therethrough to the CL input terminal of a D flip-flop DF16 and also to an AND gate AN47.

The D flip-flop DF16 is reset by the power-on reset signal POR and generates a high level output from the $\bar{Q}$ output terminal when a release switch S3 adapted to be closed in response to the shutter release operation and an AE lock switch S4 adapted to be closed in response to the AE lock operation remain opened, that is, when none of the shutter release and AE lock operations is not effected. This is because the output from the AND gate AN46 is in the high level state. The AND gate AN47 is enabled in response to this high level output to allow the passage of the pulses of the predetermined cycle therethrough to the latch circuits 90, 92 and 94. These latch circuits 90, 92 and 94 then operate in response to these pulses to latch the respective data of the exposure time, the stop down number and the aperture value. Accordingly, when the light measuring switch S1 is closed, but the AE lock switch S4 and the release switch S3 have not yet been closed, that is, only when the light measuring operation is carried out, the data from the arithmetic circuit 88 are successively latched in the latch circuits 90, 92 and 94 according to the cycle (for example) 16 Hz of the pulses from the one-shot circuit OS11. On the other hand, when the light measuring switch S1 is subsequently opened, the output from the inverter IN1 is rendered in a low level state and the Q output from the D flip-flop DF15 is consequently rendered in a low level state, thereby disabling the AND gate AN16 to interrupt the passage of the latching signal from the one-shot circuit OS11 therethrough.

In the event that the AE lock switch S4 is closed during the closure of the light measuring switch S1, an OR gate OR15 is caused through an inverter IN11 to generate a high level signal and, when the read-in operation of the data from the accessory has already been completed, an output from an AND gate AN48 is rendered in a high level state. Therefore, the $\bar{Q}$ output of the D flip-flop DF16 is rendered in a low level state in response to the negative edge of the pulse, which is fed from the AND gate AN46 as the latching signal, and the AND gate AN47 is consequently disabled to interrupt the passage of the latching signal therethrough. Accordingly, the latch circuits 90, 92 and 94 latch the exposure information data in response to the last latching signal generated upon the closure of the AE lock switch S4 and the renewal of the data no longer take place.

When the release switch S3 is closed while the AE locked condition is established (with the Q output of the D flip-flop DF16 in the high level state), an inverter IN10 generates a high level signal and, where at this time the read-in operation of the data from the accessory has completed with the "start" terminal being consequently in the high level state, an AND gate AN45 generates a high level output to cause a flip-flop FF45 to be set in response to the positive edge thereof, thereby rendering a terminal RL in a high level state. In response to the positive edge of the terminal RL, a latch decoder 96 latches the data of the amount of error of the aperture at the time of the closure of the release switch S3, which are fed from the register REG12 shown in FIG. 1, and then decode them into the data ΔAv2 for the arithmetic calculation. At a subtractor 102, the following equation is calculated:

$$Av - \Delta Av2 - Avo \quad (11)$$

In addition in view of the terminal RL in the high level state, the flip-flop FF10 (FIG. 1) is set and the AND gate AN40 is consequently disabled with the result that the start signal no longer emerges from the AND gate AN40. After the lapse of a predetermined time determined by a delay circuit DL1 subsequent to the time when the terminal RL is brought in a high level state, the delay circuit DL1 generates a high level output to trigger a release circuit 104 on, thereby initiating the exposure control operation. It is to be noted that during the predetermined delay time, the availability of the electric power from the power source in the camera body and the presence or absence of a camera wobbling action are checked.

The aperture control device 54 is operable to stop down the aperture from the minimum aperture value by a value corresponding to the data fed from the subtractor 102, that is, by a value represented by Av−ΔAv2−Avo. Accordingly, the aperture when so stopped down is of a value corresponding to Av−ΔAv2, but since the amount of error at this time is ΔAv2, the actual effective aperture is expressed by the following equation:

$$(Av - \Delta Av2) + \Delta Av2 = Av \quad (12)$$

and thus, it is controlled to the aperture value coinciding with a proper aperture value outputed from the arithmetic circuit 88 with any influence from the amount of error Av1 at the time of the AE locked condition having been removed. On the other hand, a shutter control device 98 generates a low level output for a predetermined time based on the data fed from the arithmetic circuit 88 and an electromagnet Mg is energized in response to the low level output from the shutter control device 98 to interrupt a shutter closing operation thereby to control the exposure time. Thus, in the case where the exposure is controlled on the basis of the AE lock, since the aperture control can be effected after the stop down number had been corrected to a value in which the amount of error of the aperture at the time of shutter release, the effective aperture value can accurately be controlled to the calculated or preset value. Accordingly, this invention is free from the problem heretofore encountered that the exposure error occurs when the photo-taking is performed while the focal length of the zoom lens assembly is set to a different value at the time of the AE lock and the shutter release, respectively.

When the output from the shutter control device 98 is reversed to a high level state and the electromagnet Mg is consequently brought into a non-conductive state to initiate the shutter closing operation, an output CM of a delay circuit 100 is brought into a high level state after the lapse of a predetermined time determined by the delay circuit 100. This signal is then fed through the OR gate OR10 (FIG. 1) to reset the flip-flop FF10, thereby enabling the AND gate AN40 to initiate the read-in operation of the data from the accessory. The exposure time display device 52 displays the exposure time on the basis of the exposure time data Tv fed from the latch circuit 90, whereas the aperture display device 56 displays the effective aperture value controlled on the basis of the aperture data Av fed from the latch circuit 94.

A normal photo-taking without any AE lock operation will now be described. When the release switch S3 is closed subsequent to and during the closure of the light measuring switch S1, the output from the inverter IN10 is brought into a high level state and, where at this time the "start" terminal is in a low level state as a result of completion of the read-in operation, the AND gate AN48 generates a high level output. Therefore, the $\overline{Q}$ output from the D flip-flop DF16 is rendered in a low level state in response to the negative edge of the pulse from the AND gate AN46, thereby disabling the AND gate AN47 to interrupt the passage of the latching signal therethrough. On the other hand, since the Q output from the D flip-flop DF16 is rendered in a high level state, the AND gate AN45 generates a high level signal with which the flip-flop FF45 is set and, consequently, the terminal RL is rendered in a high level state. Then, after the predetermined period of time determined by the delay circuit DL1, the release circuit 104 is operated to initiate the exposure control operation. It is to be noted that, in the event that the light measuring and release switches S1 and S3 are substantially simultaneously closed, the $\overline{Q}$ output from the D flip-flop DF16 is in a high level state and, therefore, one latching pulse can assuredly emerge from the AND gate AN47. This is also true even when the closure of the release switch S3 is followed by the closure of the light measuring switch S1, because the $\overline{Q}$ output of the D flip-flop DF16 is in the high level state before the first latching pulse, which has been generated from the one-shot circuit OS11 subsequent to the resetting of the divider DI5 with the power-on reset signal POR resulting from the closure of the light measuring switch S1, terminates. Accordingly, there is no possibility that the exposure control operation will be initiated before the exposure control information is latched in the latch circuits 90, 92 and 94. This is also the case with the AE lock switch S4, and even if the AE lock switch S4 is closed prior to th closure of the light measuring switch S1, no latching takes place, but since the AND gate AN47 is disabled after the first latching pulse has emerged from the AND gate AN47 as a result of the closure of the light measuring switch S1 effected during the closure of the AE lock switch S4, the exposure control information data created at the time of the closure of the light measuring switch S1 are latched.

When the terminal RL is brought into a high level state, the latch decoder 96 is latched with the data of the amount of error of the aperture fed from the register REG12, which are then converted into the data $\Delta Av$ for the arithmetic calculation. At this time, the exposure control information data based on the exposure value Ev free from the term of the amount of error of the aperture included in the measured light output as hereinbefore described are latched in the latch circuit 90, 92 and 94. In the subtractor 102, the following equation;

$$Av - \Delta Av - Avo \quad (11)$$

is calculated, and the aperture control device 54 stops down the aperture from the minimum aperture value in an amount corresponding to these data. Accordingly, the aperture so stopped down corresponds to $Av - Av$, but since the amount of error of the aperture represents Av, the effective aperture is expressed by the following equation and is controlled to a value coinciding with the aperture value outputed from the arithmetic circuit 88.

$$(Av - \Delta Av) + \Delta Av = Av \quad (12)$$

The display device 56 displays the effective aperture value so controlled, and the exposure time is also displayed based on the exposure time calculated without being affected by the amount of error $\Delta Av$ of the aperture. Thus, any possible problem, heretofore encountered that, because the arithmetic calculation is performed with the measured light output including the amount of error $\Delta Av$ of the aperture, the camera wobbing action tends to occur, can substantially be eliminated.

The method for correcting the amount of error of the aperture described with reference to FIG. 7 can be modified as follows. Namely, without correcting the amount of error of the aperture, the exposure value $Ev - \Delta Av$ is fed to the exposure arithmetic circuit 88, and the arithmetic circuit 88 performs the following calculations: In the case of the P-mode;

$$\left. \begin{array}{l} p \cdot (Ev - \Delta Av) = Av - p \cdot \Delta Av \\ Ev - \Delta Av - (Av - p \cdot \Delta Av) = Tv - (1 - p) \cdot \Delta Av \\ Av - p \cdot \Delta Av - Avo \end{array} \right\} \quad (13)$$

In the case of the T-priority mode;

$$\left. \begin{array}{l} Ev - \Delta Av - Tvs = Av - \Delta Av \\ Av - \Delta Av - Avo \end{array} \right\} \quad (14)$$

In the case of the A-priority mode;

$$\left. \begin{array}{l} Ev - \Delta Av - Avs = Tv - \Delta Av \\ Avs - Avo \end{array} \right\} \quad (15)$$

Where the AE lock is effected, the exposure information data calculated according to the equations (13), (14) and (15) are stored without updating the latch circuits 90, 92 and 94, and the data $\Delta Av1$ of the amount of error of the aperture is further stored. Then, the following calculations are performed:

In the case of the P-mode;

$$\left.\begin{array}{l}(Av - p \cdot \Delta Av1) + p \cdot \Delta Av1 = Av \\ \{Tv - (1 - p) \cdot \Delta Av1\} + (1 - p) \cdot \Delta Av1 = Tv \\ Av - p \cdot \Delta A1 - Avo + p \cdot \Delta Av1 = Av - Avo\end{array}\right\} \quad (16)$$

In the case of the T-priority mode;

$$\left.\begin{array}{l}Av - \Delta Av1 + \Delta Av1 = Av \\ Av - \Delta Av1 - Avo + \Delta Av1 = Av - Avo\end{array}\right\} \quad (17)$$

In the case of the A-priority mode;

$$Tv - \Delta Av1 + \Delta Av1 = Tv \quad (18)$$

Ater the shutter release, the data $\Delta Av2$ of the amount of error of the aperture is stored, and the following equation is calculated so that the aperture can be controlled on the basis of the data so calculated while the exposure time is controlled on the basis of the calculated or preset exposure time data.

$$Av - \Delta Av2 - Avo, \; Avs - \Delta Av2 - Avo \quad (19)$$

The exposure control under the T-priority mode according to this method will now be described with reference to FIGS. 7 and 8.

Figure 8:
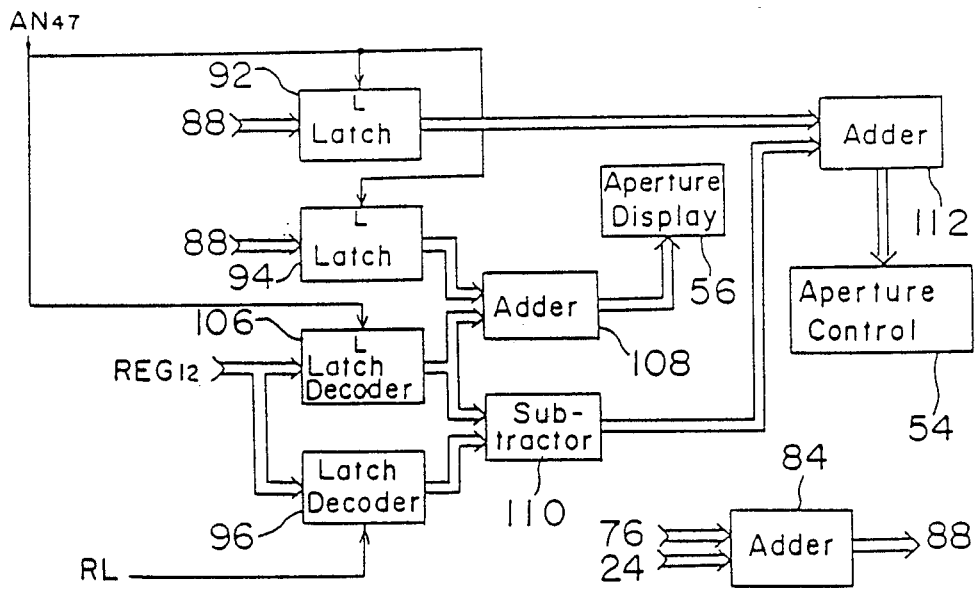
FIG. 8 is a block circuit diagram showing a modified form of the exposure control unit.

FIG. 8 is a block circuit diagram showing only an essential portion different from that shown in FIG. 7. The adder 84 calculates $Ev - \Delta Av$ based on the data of $Bv - \Delta Av$ fed from the address 76 and the film speed data Sv fed from the data setting device 24 and supplies this data to the exposure arithmetic circuit 88. At the time of the AE lock, the data of $Av - \Delta Av1 - Avo$ and $Av - \Delta Av1$ are respectively stored in the latch circuits 90 and 92, and the data $\Delta Av1$ of the amount of error of the aperture fed from the register REG12 are latched in a latch decoder 106. These data $\Delta Av1$ for the arithmetic calculation are fed to an adder 108 where the equation, $(Av - \Delta Av1) + \Delta Av1$, is calculated. The aperture display device 56 displays the aperture value corresponding to the data Av. Subsequently, at the time of the shutter release, a subtractor 110 performs the calculation of $\Delta Av1 - \Delta Av2$ based on the data $\Delta Av2$ of the amount of error of the aperture then fed from the latch decoder 96 and the data $\Delta Av1$ of the amount of error of the aperture at the time of the AE lock. The data of the difference in amount of error of the aperture and the data $Av - Avo - \Delta Av1$ fed from the latch circuit 92 are fed to an adder 112. Then, the adder 112 performs the following calculation to give the data $Av - Avo - \Delta Av2$ with which the aperture is controlled.

$$Av - Avo - \Delta Av1 + (\Delta Av1 - \Delta Av2) = Av - Avo - \Delta Av2 \quad (20)$$

Although the data read-in circuit shown in FIGS. 1 and 3 is so designed that the data of the amount of error of the aperture can be transmitted from the zoom lens assembly to the camera body it can be modified so that the data of the amount of error of the aperture can be automatically detected in the camera body based on other information of the zoom lens assembly. By way of example, the ROM in the circuit arrangement used in the camera body may be so constructed that, if the shortest and the longest focal lengths of the zoom lens assembly are known, the camera body can understand what type of zoom lens assembly is being used. In such case, these data of the focal length can be utilized to specify the highest significant bit of the address of the ROM in the camera body while the preset focal length data may be used to specify the least significant bit, thereby giving the amount of error of the aperture. If this construction is to be employed, it is enough for the lens assembly to transmit the data including the shortest focal length, the longest focal length and the preset focal length. Furthermore, instead of the shortest and the longest focal lengths, the data indicative of the type of the lens assembly may be transmitted.

It is to be noted that, where the data from the subtractor 102 shown in FIG. 7 come to represent $Av - \Delta Av - Avo < 0$, the under exposure tends to occur even when the aperture of the lens assembly has been set to the minimum aperture value (the minimum F-number). In such case, it is recommended to switch the mode over to the A-priority mode with $Avo + \Delta Av$ being used as the preset aperture value to cause the arithmetic operation for the A-priority mode, thereby re-calculating the exposure time to be controlled.

Even where the preset aperture value is $Avo + \Delta Av > Avs \geq Avo$, since it is impossible to control the effective aperture value to Avs, the arithmetic and control operation has to be performed in a similar manner with $Avo + \Delta Av$ being used as the preset value while a warning is preferably effected to inform the photographer that the control at Avs is impossible.

A zoom lens assembly of a type wherein the amount of error of the aperture varies, not with change in focal length such as hereinbefore described, but with change in both of the focal length and the aperture value, for example, a zoom lens assembly wherein at the maximum aperture setting the amount of error of the aperture varies with change in focal length., but at the minimum aperture setting the amount of error of the aperture is zero regardless of the focal length, is currently commercially available. With such a lens assembly, the address of the ROM is preferably specified by the data corresponding to both of the focal length and the aperture value so that the data of the amount of error of the aperture can be outputted.

In addition, although in the foregoing description only the correction of the amount of error of the aperture according to the adjustment of the focal length of the zoom lens assembly has been described, a lens assembly of a type wherein the effective aperture varies with rotation of a focusing ring which is a distance setting member of such lens assembly is also commercially available. Especially, in the case of a lens assembly, for example, a macro lens assembly, wherein the shifting amount is large, the effective aperture tends to vary considerably. In such case, the correction can be achieved if the amount of error of the aperture resulting from the focusing is made to be read from the lens assembly in the camera body as is the case with this invention.

In the foregoing description, the camera body has been described as having the lens assembly, for example, the zoom lens assembly or the macro lens assembly, coupled interchangeably thereto. However, it should be noted that the concept of this invention can equally apply to the camera body, having, for example, the zoom lens assembly, rigidly (non-interchangeably) coupled thereto. In addition, although the circuit has been described as constituted by a logic circuit for the illustration of this invention, the operation thereof may be programed so that a microprocessor(CPU) can sequentially control the operation according to the program stored therein.

Where flash photography is carried out by the use of an electronic flash unit in such a way that the flash control takes place by means of an electronic flash unit so constructed as to interrupt the flashing when the integrated value of light measured by a light measuring circuit incorporated in the flash unit attains a predetermined value corresponding to a predetermined aperture value of the camera, or in such a way as to utilize the fact that the product of the camera-to-object distance times the aperture of the camera corresponds to the flash capacity (corresponding to a so-called "guide number") of the electronic flash unit, it is necessary for the aperture value of the photo-taking lens assembly of the camera to be set at the predetermined preset value or the calculated value. Where the zoom lens assembly is used for the photo-taking lens assembly as is the case hereinbefore discussed any change in amount of error of the aperture resulting from change in focal length may result in deviation from the proper flash photographing condition. The exposure control device according to this invention can be utilized even in such a case, and as an embodiment thereof, the photo-taking under the flash lighting wherein the aperture value is determined based on the amount of flash light Iv emitted from the electronic flash unit and the camera-to-object distance Dv will now be described with particular reference to FIG. 9.

Figure 9:
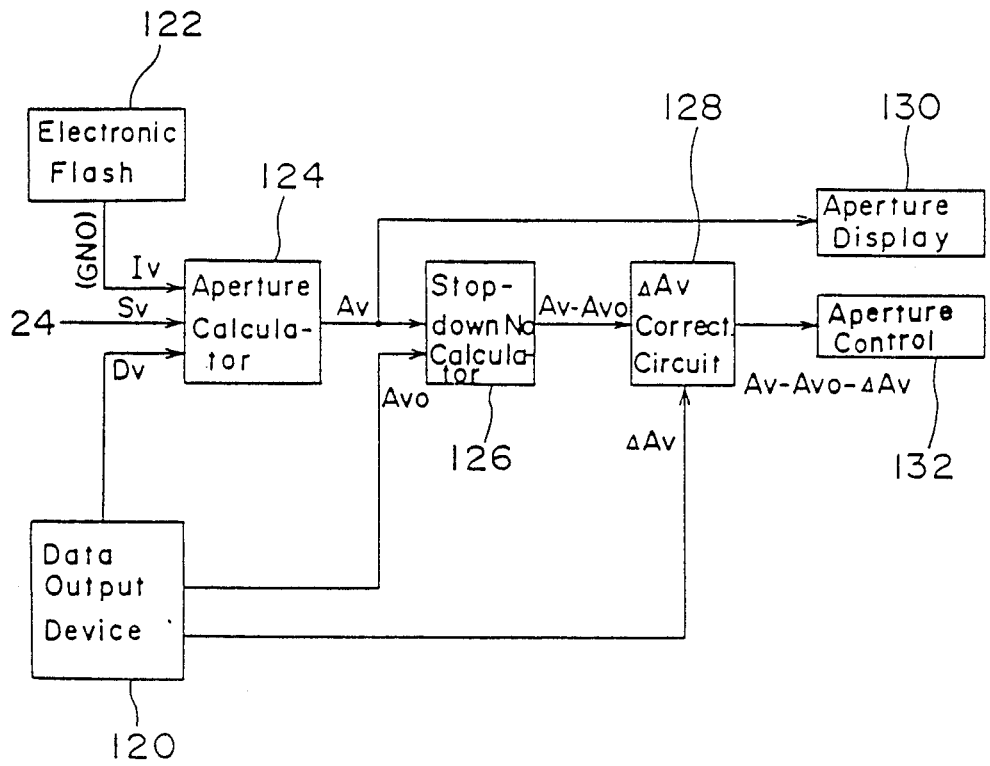
FIG. 9 is a block diagram of a circuit suited for the exposure under flash lighting.

FIG. 9 is a circuit block diagram showing a circuit construction suited for exposure control under flash lighting. Referring to FIG. 9, a data output device 120 shown therein includes the register REG2 described with reference to and shown in FIG. 1 and is adapted to output distance data Dv indicative of the distance between such device and the target object to be photographed, the minimum aperture value data Avo and the data Av of the amount of error of the aperture. A calculator 124 for the calculation of the aperture value for use in the photo-taking under the flas lighting condition performs the following calculation, using data Iv of the amount of flash light emitted from an electronic flash unit 122, fed from the electronic flash unit 122, the distance data Dv fed from the data output device 120, and the film speed data Sv fed from the film speed data output device 24.

$$Sv + Iv - Dv = Av$$

After this calculation, the calculator 124 generates data Av of the aperture value necessary to obtain a proper exposure. The aperture value data Av are displayed by an aperture display device 130 and are also supplied to a stop-down number calculator 126 for calculating the stop-down number. Since the stop-down number calculator 126 is supplied with the minimum aperture value data Avo, the stop-down number necessary for the control of the aperture to the proper aperture value Av can be calculated on the basis of the difference between the minimum aperture value data Avo and the aperture value data Av. It is to be noted that the minimum aperture value data Avo usually represent the minimum F-number at the shortest focal length. A correcting circuit 128 is operable to calculate effective stop number data (Av−Avo−ΔAv) on the basis of the stop-down number data (Av−Avo), obtained from the stop-down number calculator 126, and the data ΔAv fed from the data output device 120. Based on the result of calculation performed by the correcting circuit 128, an aperture control circuit 132 controls the aperture in such a way as to counterbalance the data ΔAv of the amount of error of the aperture resulting from the stop-down of the aperture and to control to an aperture size corresponding to the aperture value Av to be controlled.

Although in the foregoing description the circuit shown and described is in the form of a logic circuit, the operation thereof may be so programed that a microprocessor (CPU) can sequentially control it according to such program stored therein.

For the purpose of reference, the problem which would arise when this invention is not adopted despite the fact that the zoom lens assembly used is of a type wherein the amount of error of the aperture varies with change in focal length will be discussed.

In the first place, in the case of the M-mode, the effective aperture value attributable to the controlled aperture size will be Avs+ΔAv wherein Avs represents the preset aperture value and ΔAv represents the amount of error of the aperture at a preset focal length of the zoom lens assembly. Accordingly, a problem arises in that the actual aperture value at the time of photo-taking will be the one smaller than the preset aperture value by ΔAv, and the under exposure condition will occur particularly where the preset aperture value and the preset exposure time are based on the reading of a separate exposure meter independent from the camera. In the case of the A-priority mode, the effective aperture value will be Bv−(Avo−ΔAv), wherein Avo represents the minimum aperture value and Bv represents the brightness of the target object, because the data ΔAv of the amount of error of the aperture is included in the measured light output obtained through the through-the-lens metering system, and if the film speed is expressed by Sv, the equation, Bv−(AVo+ΔAv)+Avo+Sv-Avs=Tv−ΔAv, is calculated based on this measured light output. Therefore, at the time of the photo-taking, the aperture value is set to a value, AVs+ΔAv, smaller than the preset aperture value Avs by ΔAv while the exposure time remains at Tv−ΔAv. In such case, although the control is made to a proper exposure, the aperture is set at a value smaller than the preset value by ΔAv with corresponding prolongation of the exposure time and there is a great possibility of the occurrence of the camera wobbling action. In the case of the T-priority mode, the measured light output will be Bv−(Avo+ΔAv) as in the case under the A-priority mode and the equation, Bv−(Avo+-ΔAv)+Avo+Sv+Tvs=Av-ΔAv, is calculated from this measured light output. In such case, the term of ΔAv is counterbalanced at the time of the aperture control with the exposure time set to Tvs, resulting in the control at the aperture value and the exposure time which are the same as that when the amount of error of the aperture is zero. However, there is a problem in that the aperture value displayed reads a value larger than the controlled aperture value by ΔAv.

Moreover, in the case of the P-mode, the following equations:

$$Bv-(Avo+\Delta Av)+Avo+Sv=Ev-\Delta Av$$

$$p \cdot (Ev - \Delta Av) = Av - p \cdot \Delta Av$$

$$(Ev - \Delta Av) - (Av - p \cdot \Delta Av) = Tv - (1-p) \cdot \Delta Av$$

are calculated, and the aperture and the exposure time are controlled to $Av + (1-p) \cdot \Delta Av$ $(0 < p < 1)$ and $Tv - (1-p) \cdot \Delta Av$, respectively. Although the control is made to a proper exposure even in this case, the aperture value displayed reads a value larger than the controlled aperture value by $p \cdot \Delta Av$ and the controlled exposure time is set to a value greater by $(1-p) \cdot \Delta Av$, resulting in the possible occurrence of the camera wobbling action.

In addition thereto, the problem which would arise when, while the above described zoom lens is employed, the AE lock is performed without this invention being applied will now be described. Let it be assumed that, at the time the AE-lock is effected, the zoom lens assembly is set at the shortest focal length and the amount of eror of the aperture at that time is zero. In this condition, assuming that the APEX value of the minimum aperture value is expressed by Avo and the APEX value of the brightness of a particular portion of the target object at the time hhe AE lock has been effected is expressed by Bv, the measured light output will be Bv-Avo. Based on this value, one of the following equations (i), (ii) and (iii) is performed and the data of the exposure control value (the value of Av or Tv) so calculated is stored at the time of the AE lock:

$$(Bv - Avo) + Avo + Sv - Tvs = Av \qquad (i)$$

$$(Bv - Avo) + Avo + Sv - Avs = Tv \qquad (ii)$$

$$\left. \begin{array}{l} p[(Bv - Avo) + Avo + Sv] = Av \\ Ev - Av = Tv \end{array} \right\} \qquad (iii)$$

In these equations, Avs, Sv and Tvs represent the respective APEX values of the preset aperture value, the film speed, and the exposure time, Av and Tv represent the respective APEX values of the calculated aperture value and the calculated exposure time, and p represents a program constant wherein $0 < p < 1$. When the zoom lens assembly is, while the AE lock is effected, manipulated to render the focal length to be adjusted towards the longest focal length to frame the composition of the image of the target object and the shutter is subsequently released by depressing the shutter button, the aperture and the exposure time are controlled on the basis of the exposure control information set and stored at the time of the AE lock.

However, since the amount of error of the aperture varies from zero to $\Delta Av$ $(>0)$ as a result of change in focal length of the zoom lens assembly, the stop-down of the aperture based on the preset or stored aperture value will result in the actual aperture value reading $Avs + \Delta Av$ or $Av + \Delta Av$. On the other hand, since the exposure time controlled remains at a time corresponding to Tvs or Tv, there is a problem in that the exposure of that particular portion of the target object which has been measured at the time of AE lock will be short of the required value by $\Delta Av$.

To generalize the above description concerning the problem which would arise without this invention applied, assuming that the amount of error of the aperture at the focal length reading at the time of AE lock is $\Delta Av1$ and that reading at the time of the shutter release is $\Delta Av2$, the measured light output will be $Bv - \Delta Av1 - Avo$. Based on this value, one of the following equations (iv), (v) and (vi) is calculated and the exposure control information so calculated is stored at the time of AE lock:

$$(Bv - \Delta Av1 - Avo) + Avo + Sv + Tvs = Av - \Delta Av1 \qquad (iv)$$

$$(Bv - \Delta Av1 - Avo) + Avo + Sv - Avs = Tv - \Delta Av1 \qquad (v)$$

$$p \cdot [(Bv - \Delta Av1 - Avo) + Avo + Sv] = Av - P \cdot \Delta Av1$$

$$(Ev - \Delta Av1) - (Av - p \cdot \Delta Av1) = Tv - (1-p) \Delta Av1 \qquad (vi)$$

When the zooming is effected to change the focal length while the AE lock is effected and the shutter is subsequently released, the exposure control will take place in the following manner. That is, where the equation (iv) is calculated, the aperture and the exposure time are controlled to $\Delta Av1 + \Delta Av2$ and Tvs, respectively; where the equation (v) is calculated, the aperture and the exposure time are controlled to $Avs + \Delta Av2$ and $Tv - \Delta Av1$, respectively; and where the equation (vi) is calculated, the aperture and the exposure time are controlled to $Av - p \cdot \Delta Av1 + \Delta Av2$ and $Tv - (1-p) \Delta Av1$, respectively. Accordingly, in either case, the exposure results in error by an amount corresponding to $\Delta Av2 - \Delta Av1$.

However, according to this invention, it is clear that the foregoing problems can be advantageously eliminated.

Another preferred embodiment of this invention will now be described with reference to FIGS. 10(a) and 10(b) which illustrate, in block circuit representation, a circuit incorporated in the camera body and a circuit incorporated in the lens assembly, respectively.

Figure 10A:
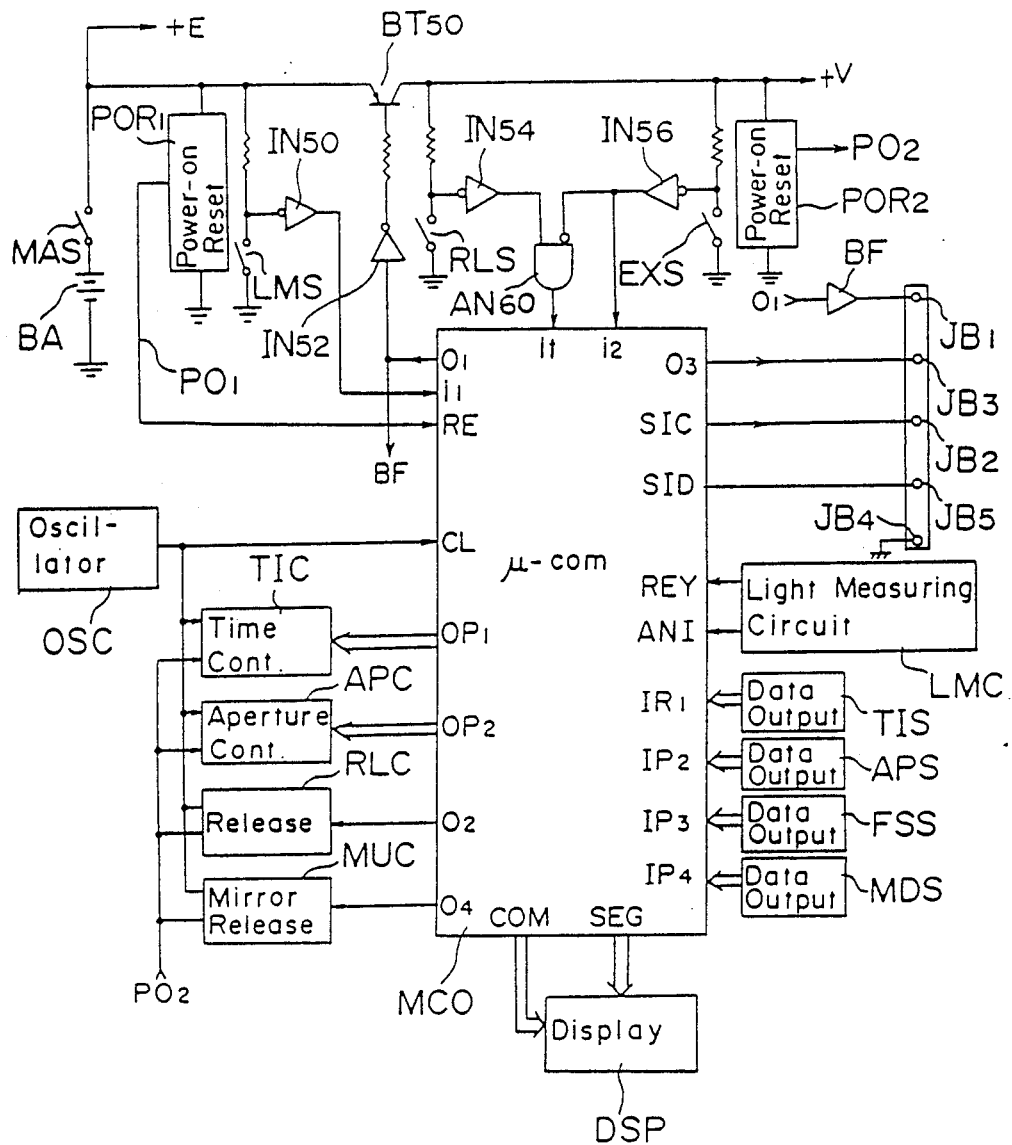
FIG. 10(a) is a block diagram showing a circuit incorporated in the camera body according to another embodiment of this invention.

Referring first to FIG. 10(a), BA represents a battery power source, and MAS represents a manually operable power switch. When the switch MAS is closed, an electrical power is supplied to both a microcomputer MCO and an oscillator OSC through a power line +E. In addition, the closure of the power switch MAS results in the operation of a power-on reset circuit POR1 with a reset signal consequently fed from an output terminal PO1 to a reset terminal RE of the microcomputer MCO to reset the latter. The oscillator OSC brought into operation upon closure of the power switch MAS generates clock pulses which are in turn fed to a clock terminal CL of the microcomputer MCO. The clock pulses from the oscillator OSC are also fed to an exposure time control circuit TIC, an aperture control circuit APC, a release circuit RLC, and a mirror release circuit MRC.

LMS represents a light measuring switch adapted to be closed upon depression of a shutter release button (not shown) through the first half of the full stroke of movement of the shutter release button. When this switch LMS is closed, an inverter IN50 generates a high level signal which is in turn fed to an input terminal i1 of the microcomputer MCO. Upon receipt of this high level signal applied to the input terminal i1 the microcomputer MCO generates a high level signal from an output terminal 01 which is in turn fed to an inverter IN52 to cause the latter to generate a low level signal. In response to this low level signal from the inverter IN52, a transistor BT50 is brought into a conducting state to effect the supply of the electric power to circuit components other than the oscillator OSC and the microprocessor MCO and also to the circuit in the lens assembly through a buffer BF, and coupling terminals JB1 and JL1 by way of a power line +VF in the lens assembly.

When the supply of the electric power from the power line +V is initiated upon conduction of the transistor BT50, a power-on reset circuit POR2 is operated to generate a reset pulse from its output terminal P02, which is in turn fed to the exposure time control circuit TIC, the aperture control circuit APC, the release circuit RLC and the mirror release circuit MRC to reset the latter.

LMC represents a light measuring circuit capable of generating a measured light output which is an analog signal representing Bv−Avo wherein Bv is the brightness of the target object and Avo in the minimum aperture value. This analog output is in turn fed to an analog input terminal AN1 of the microcomputer MCO for the analog-to-digital conversion. The microcomputer MCO has a reference potential input terminal REV to which a reference potential for an analog-to-digital converter incorporated in the microcomputer MCO is applied from a constant voltage source incorporated in the light measuring circuit LMC.

TIS represents a data output device for supplying data of the preset exposure time to an input port IP1 of the microcomputer MCO. APS represents a data output device for supplying data of the preset aperture value to an input port IP2 of the microcomputer MCO. FSS represents a data output device for supplying data of the preset film speed to an input port IP3 of the microcomputer MCO. MDS represents a data output device for supplying data of the present exposure arithmetic mode to an input port IP4 of the microcomputer MCO. DSP is a display unit for displaying exposure control values, the contents to be displayed being controlled by a common terminal COM and a segment terminal SEG both fed by the microcomputer MCO.

Figure 10B:
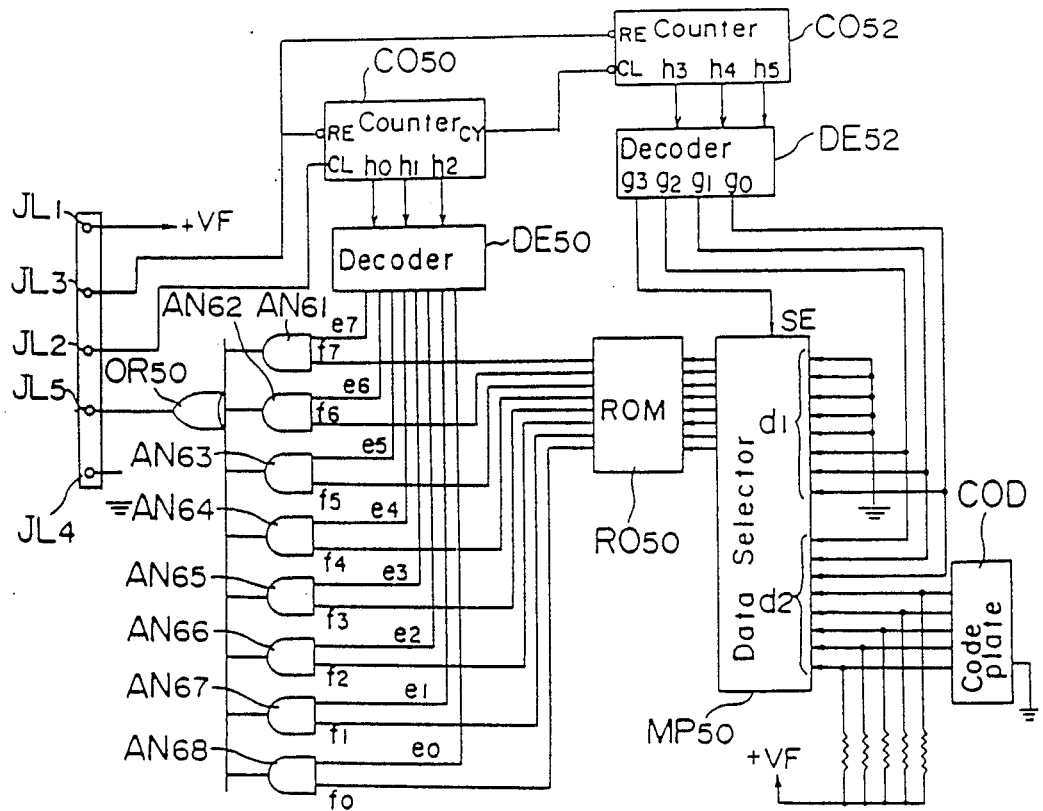
FIG. 10(b) is a block diagram showing a circuit incorporated in the zoom lens assembly according to another embodiment of this invention.

An output terminal 03 of the microcomputer MCO is connected to reset terminals RE of respective counters C050 and C052 (FIG. 10(b)) in the lens assembly through coupling terminals JB3 and JL3 (FIG. 10(b)). This output terminal 03 is in a high level state when the data are read out from the interchangeable lens assembly, thereby releasing the counters C050 and C052 from their reset states. A terminal SIC of the microcomputer MCO is an output terminal through which, when coupling terminals JB2 and JL2 are connected together, the clock pulses are fed to the lens assembly for synchronizing at the time when the data are serially read in to a terminal SID of the microcomputer MCO. It is to be noted that the terminal JL2 is, as shown in FIG. 10(b), connected to a clock input terminal CL of the counter C050 whereas the input terminal SID is connected with the output of an OR gate OR50 through coupling terminals JL5 and JB5.

Figure 11:
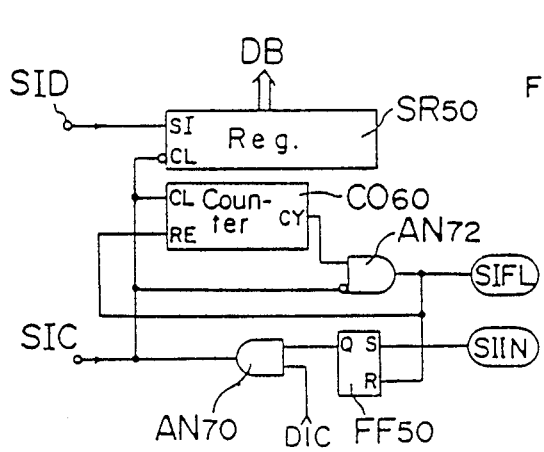
FIG. 11 is a circuit block diagram showing a serial data read-in unit used in the circuit of FIG. 10(a)
Figure 12:
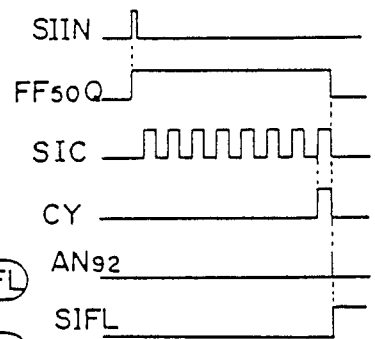
FIG. 12 is a timing chart showing the operation of the circuit of FIG. 11.

FIG. 11 illustrate one example of a circuit of a serial data read-in unit associated with the terminals SIC and SID and incorporated in the microcomputer MCO. FIG. 12 illustrate a chart showing the timing of operation of the circuit of FIG. 11. Referring now to FIG. 11, when a serial data read-in command SIIN is present, a flip-flop FF50 is set, as shown by a waveform FF50 Q in FIG. 12, and therefore, clock pulses DIC, which are the clock pulses fed from the oscillator OSC and subsequently divided in the microcomputer MCO, are allowed to pass through an AND gate AN70 to the terminal SIC as shown by a waveform SIC in FIG. 12. At the same time, the clock pulses emerging from the AND gate AN70 are fed to respective clock terminals CL of a 3-bit binary counter C060 and a shift register SR50. The shift register SR50 is operable to take in the data from the terminal SID in response to the negative edge of each of the clock pulses fed to the clock terminal CL thereof.

In response to the positive edge of the eighth clock pulse, a carry terminal of the counter C060 is rendered in a high level state as shown by a waveform CY in FIG. 12, and the output from an AND gate AN72 is rendered, as shown by a waveform AN72 in FIG. 12, in a high level state in response to the negative edge of the eighth clock pulse. The flip-flop FF50 and the counter C060 are in turn reset as shown by the waveforms FF50 and CY in FIG. 12, and a serial data input flag SIFL is rendered in a high level state as shown by a waveform SIFL in FIG. 12, thereby completing the operation.

Referring back to FIG. 10(a), the switch RLS is a release switch adapted to be closed during the depression of the release button through the latter half of the full stroke of movement of the release button, and a switch EXS is a switch adapted to be closed when the operation of an exposure control mechanism (not shown) completes, but opened when the charging of the exposure control mechanism in readiness for the exposure control operation completes. When the release switch RLS is closed while the output from an inverter IN56 is in a low level state as a result of the opening of the switch EXS subsequent to the completion of the charging of the exposure control mechanism, a high level output emerges from an AND gate AN60. Since the output terminal of the AND gate AN60 is connected to an interrupting terminal it of the microcomputer MCO, the exposure control operation is initiated when the interrupting terminal it of the microcomputer MCO is rendered in a high level state. This takes place no matter what operation the microcomputer MCO is then doing. On the other hand, if the output from the inverter IN56 is in the high level state as a result of the closure of the switch EXS while the charging of the exposure control operation has not yet been finished, the closure of the release switch RLS does not bring the output from the AND gate AN60 in a high level state and, therefore, the microcomputer MCO will not operate for the exposure control.

The microcomputer MCO has an output port OP1 from which exposure time data Tv are outputed to the exposure time control circuit TIC; an output port OP2 from which stop-down number data Av−Avo are outputed to the aperture control circuit APC; an output terminal 02 from which a pulse is outputed to the release circuit RLS for initiating the exposure control operaiion; and an output terminal 04 from which a pulse is outputed to the mirror release circuit MRC for initiating a mirror up movement. It is to be noted that the input ports IP1 to IP4 and the output ports OP1 and OP2 of the microcomputer MCO may be replaced with common data buses so that the data transfer between the terminals TIS, APS, FSS, MDS, TIC and. APC can take place on a time-sharing basis.

Referring now to FIG. 10(b), each of the counters C050 and C052 is comprised of a 3-bit binary counter, the counter C050 being operable to count the number of positive edges of the clock pulses fed from the terminal SIC whereas the counter C052 is operable to count the number of negative edges of pulses fed from a carry terminal CY of the counter C050. Three-bit outputs h2, h1 and h0 of the counter C050 are fed to a decoder DE50 which in turn generates the following signals, tabulated in Table 6, one at a time depending on the data fed from the counter C050.

TABLE 6

| C050 | | | Decoder DE50 | | | | | | | |
|---|---|---|---|---|---|---|---|---|---|---|
| h2 | h1 | h0 | e7 | e6 | e5 | e4 | e3 | e2 | e1 | e0 |
| 0 | 0 | 0 | H | L | L | L | L | L | L | L |
| 0 | 0 | 1 | L | L | L | L | L | L | L | H |
| 0 | 1 | 0 | L | L | L | L | L | L | H | L |
| 0 | 1 | 1 | L | L | L | L | L | H | L | L |
| 1 | 0 | 0 | L | L | L | L | H | L | L | L |
| 1 | 0 | 1 | L | L | L | H | L | L | L | L |
| 1 | 1 | 0 | L | L | H | L | L | L | L | L |
| 1 | 1 | 1 | L | H | L | L | L | L | L | L |

Three-bit outputs g3, g2, g1 and g0 of the counter C052 are fed to a decoder DE52 which in turn generates the following signals, tabulated in Table 7, one at a time depending on the data fed from the counter C052.

TABLE 7

| Counter C052 | | | Decoder DE52 | | | |
|---|---|---|---|---|---|---|
| h5 | h4 | h3 | g3 | g2 | g1 | g0 |
| 0 | 0 | 0 | 0 | 0 | 0 | 0 |
| 0 | 0 | 1 | 0 | 0 | 0 | 1 |
| 0 | 1 | 0 | 0 | 0 | 1 | 0 |
| 0 | 1 | 1 | 0 | 0 | 1 | 1 |
| 1 | 0 | 0 | 0 | 1 | 0 | 0 |
| 1 | 0 | 1 | 1 | 0 | 0 | 1 |
| 1 | 1 | 0 | 1 | 0 | 1 | 0 |
| 1 | 1 | 1 | 1 | 0 | 1 | 1 |

Of the output terminals of the decoder DE52, the terminal g3 is connected to a select terminal SE of a data selector MP50, so that, when the terminal G3 is in a low level state, and in a high level state, the data selector MP50 outputs input data fed to an input area d1 and input data fed to an input area d2, respectively, to a read-only memory R050 as address data. The input area d1 has its five most significant bits grounded and its three least significant bits connected with the output terminals g2, g1 and g0 of the decoder DE52. Accordingly, when and so long as the output from the counter C052 represents "000" to "100", the address of the ROM R050 represented by "00000000" to "00000100" can be successively specified. The input area d2 has its three most significant bits connected with the output terminals g2, g1, and g0 of the decoder DE52 and its five least significant bits adapted to receive data fed from a code plate COD operatively associated with the focal length setting member of the zoom lens assembly. The code plate COD referred to above is of a construction substantially identical with that shown in FIG. 4. Accordingly, when and so long as the output from the counter C052 represents "101" to "111", the address of the ROM R050 represented by "001∅∅∅∅∅" to "011∅∅∅∅∅" can be specified successively. It is to be noted that the symbol "∅" represents a binary representation of either "1" or "0".

Hereinafter, data stored at each address of the ROM R050 will be described with reference to the following Table 8.

TABLE 8

| Address | Significance |
|---|---|
| 0 0 0 0 0 0 0 0 | Zoom/Fixed Focal Length |
| 0 0 0 0 0 0 0 1 | Maximum Aperture Value Avo |

TABLE 8-continued

| Address | Significance |
|---|---|
| 0 0 0 0 0 0 1 0 | Largest Aperture Value Av max |
| 0 0 0 0 0 0 1 1 | Shortest/Fixed Focal Length fw |
| 0 0 0 0 0 1 0 0 | Aperture Stabilized Time T1 |
| 0 0 1 0 0 0 0 0 | Preset Focal Length fs |
| 0 0 1 1 1 1 1 1 | |
| 0 1 0 0 0 0 0 0 | Amount ΔAv of Change of the Effective Aperture Value Resulting From Change in Focal Length |
| 0 1 0 1 1 1 1 1 | |
| 0 1 1 0 0 0 0 0 | Ratio Δf relative to Whole Capacity of Preset Focal Length |
| 0 1 1 1 1 1 1 1 | |

The ROM R050 stores at the address of "00H" (H representing a hexadecimal digit) data of F8H" in the case of the zoom lens assembly and data of "F0H" in the case of the lens assembly of fixed focal length. Accordingly, if the camera body finds that none of these data are read in the camera body, it determines that no interchangeable lens assembly is mounted and performs an exposure control under a stopped-down metering mode. On the other hand, if it finds that one of these data has been read in, the exposure control takes place under a full open metering system.

At the address of "01H", the data of the minimum aperture value Avo are stored. In the case of the lens assembly of a type having its smallest F-number variable with change in focal length, the data of the smallest F-number are stored. At the address of "02H", the data of the largest aperture value Av max are stored. However, in the case of the lens assembly of a type wherein the largest F-number varies with change in focal length, the data of the smallest F-number are stored in a similar manner. At the address of "03H", the data of the focal length in the case of the lens assembly of fixed focal length, or the data of the shortest focal length in the case of the lens assembly of variable focal length, are stored. At the address of "04H", the data corresponding to the time required for the aperture of the interchangeable lens assembly to be stabilized at the smallest aperture subsequent to being stopped down (which time is hereinafter referred to as "release time lag") are stored. The data of the minimum aperture value Avo are used for counterbalancing an element of the minimum aperture value included in the measured light value, i.e., the calculation of (Bv−Avo)+Avo=Bv, for the calculation of the stop-down number, i.e., Av−Avo, and also for the determination as to whether or not the aperture value Av is controllable. The largest aperture value Av max is used for the determination as to whether or not the aperture value Av is controllable. The data of the focal length are used for the determination as to whether or not the exposure time is a value likely to result in the camera wobbling action, in the case of the lens assembly of fixed focal length. The data of the release time lag, although the details thereof will be described later, are used for the determination of the difference between the time of release of the exposure control mechanism and the time of release of a mirror-up mechanism so that, even when the aperture has been stopped down to the maximum aperture value, the exposure incident to the opening of the shutter can take place subsequent to the stabilization of the aperture.

In the case of the zoom lens assembly, at the addresses of "0010000" to "00111111", the data of the focal length corresponding to the data from the code plate COD are stored and can be used for the determination as to whether or not a warning of the possible occurrence of the camera wobbling action should be done. At the addresses of "01000000" to "01011111", the data ΔAv of the amount of change of the aperture corresponding to the data from the code plate COD are stored. These data are used for counterbalancing an element of the amount of change of the aperture included in the measured light value, i.e., the calculation of {Bv−(Avo+ΔAv)}+Avo+ΔAv=Bv, for the calculation, Av−(Avo+ΔAv), necessitated to control the effective aperture value of the lens assembly to an aperture value Av preset in the camera body, and for the determination as to whether or not the effective aperture value can be controlled to the aperture value Av, i.e., Avo+ΔAvΔAvΔAv max+ΔAv. At the addresses of "01100000" to "01111111", data of "01" if the percentage of [(f−f min)/(f max−f min)]×100, wherein f, f min and f max represent the preset focal length, the shortest focal length and the longest focal length, respectively, is within the range of 0 to 15; data of "02H" if it is within the range of 16 to 30; data of "04H" if it is within the range of 31 to 45; data of "08H" if it is within the range of 46 to 60; data of "10H" if it is within the range of 61 to 70; data of "20" if it is within the range of 71 to 80; data of "40H" if it is within the range of 81 to 90; and data of "80H" if it is within the range of 91 to 100 are stored in correspondence with the data from the code plate COD. These data are used to indicate the capacity of the zoom lens assembly at which it is used. The foregoing are the data stored at the respective addresses of the ROM R050 and the purpose for which they are used.

Figure 13:
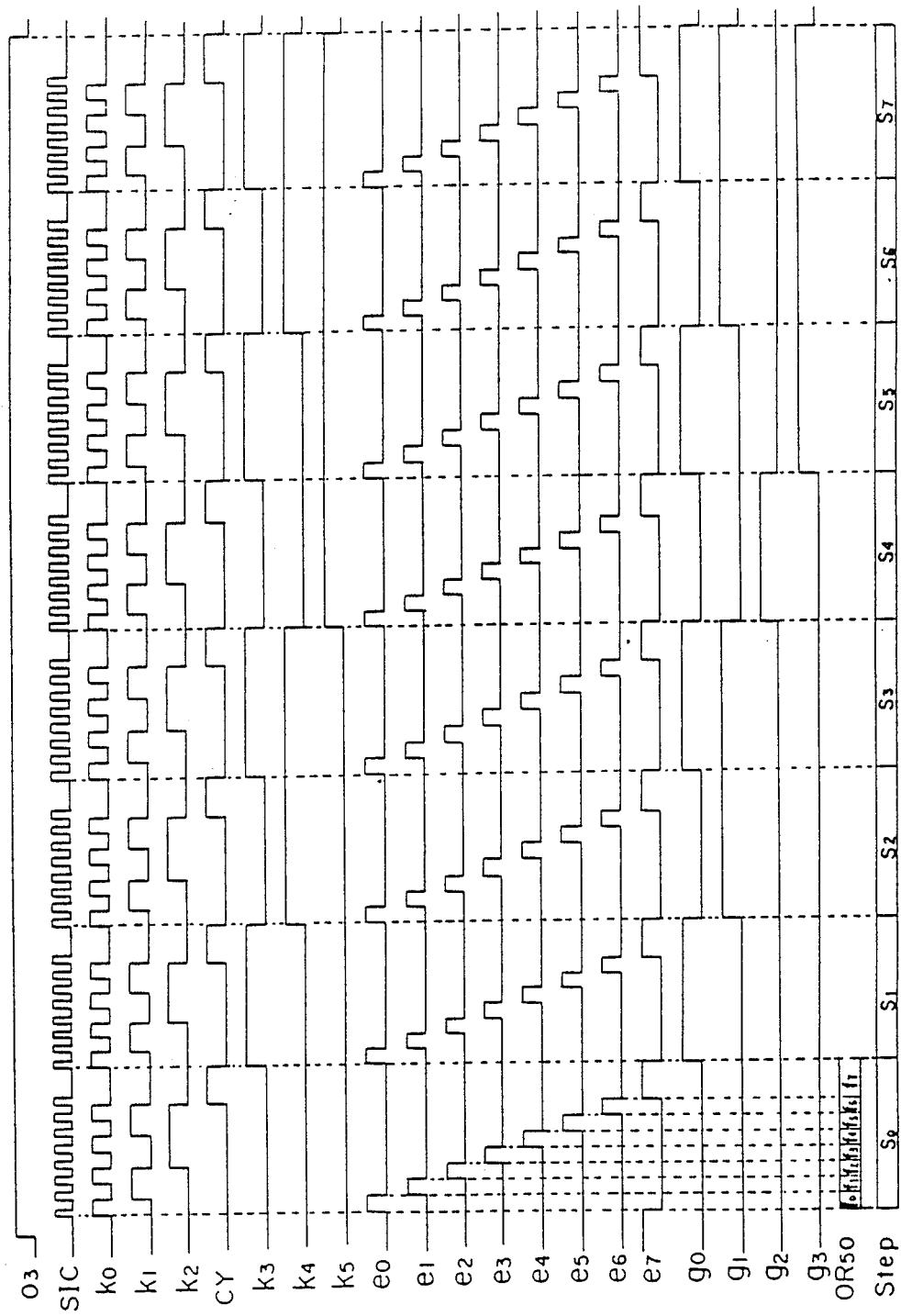
FIG. 13 is a chart showing the waveforms of various signals appearing in the circuits of FIGS. 10(a) and 10(b)

FIG. 13 illustrates a timing chart showing the data read-in operation from the lens assembly to the camera body. The data read-in operation performed from the lens assembly shown in FIG. 10(b) will now be described with particular reference to FIG. 13. In the first place, when the output terminal 03 of the microcomputer MCO is set in a high level state, the counters C050 and C052 are released from the reset states. From the clock terminal SIC of the microcomputer MCO, 8 clock pulses are outputed at each timing at which one byte data are read in in the manner described with reference to FIGS. 11 and 12. At the step So during which the initial data are read in, since the address of "00000000" of the ROM R050 is specified, check data "F0H" or F8H" are outputed, and the terminals e0 to e7 of the decoder DE50 are successively rendered in a high level state as the counter C050 continues to count and AND gates AN68 to AN61 are then successively enabled to permit the data from output terminals f0 to f7 of the microcomputer MCO to pass therethrough successively in the order from the least significant bit to the OR gate OR50 and then to the serial input terminal SID of the microcomputer MCO through the coupling terminals JL5 and JB5. The data so fed to the input terminal SID are read into the shift register SR50 in the microcomputer MCO in response to the negative edge of the clock pulse identical with the clock pulse fed from the terminal SIC, in the manner as hereinbefore described with reference to FIGS. 11 and 12.

When the eighth clock pulse is fed to the counter C050, the carry terminal CY thereof is rendered in a high level state in response to the positive edge of such clock pulse, with the consequence that the step So is shifted to the next succeeding step S1. When the clock pulse is again fed during the step S1, the carry terminal CY is rendered in a low level state in response to the positive edge of the clock pulse, and the counter C051 is, therefore, incremented by one in response to the negative edge. Thus, the address of the ROM R050 is specified by "00000001" fed from the input area d1 of the data selector MP50.

The foregoing operation is repeated until the step S4, and when the carry terminal CY is rendered in a low level state at the end of the step S4, the output of the counter C052 becomes "101" and, therefore, the output from the decoder DE52 becomes "1001". Therefore, the data selector MP50 specifies the address of "001⌀⌀⌀⌀⌀" (It is to be noted that "⌀⌀⌀⌀⌀" constituting the five least sigfnificant bits represents data from the code plate COD.) from the input area d2, and the data of the preset focal length stored at that address are read in the microcomputer in a manner similar to that described hereinbefore. At the step S6, the address of "010⌀⌀⌀⌀⌀" is specified and the data of ΔAv are read in the microcomputer MCO. At the step S7, the address of "011⌀⌀⌀⌀⌀" is specified and the data of Δf are read in the microcomputer MCO. In the manner as hereinbefore described, the data read-in operation in the case of the zoom lens assembly completes and the output terminal 03 of the microcomputer MCO is rendered in a low level state with the counters C050 and C052 consequently reset. In the case with the lens assembly of fixed focal length, the output terminal 03 of the microcomputer MCO is rendered in a low level state upon completion of the step S4, and the counters C050 and C052 are reset, thus, completing the data read-in operation from the lens assembly.

Figure 14:
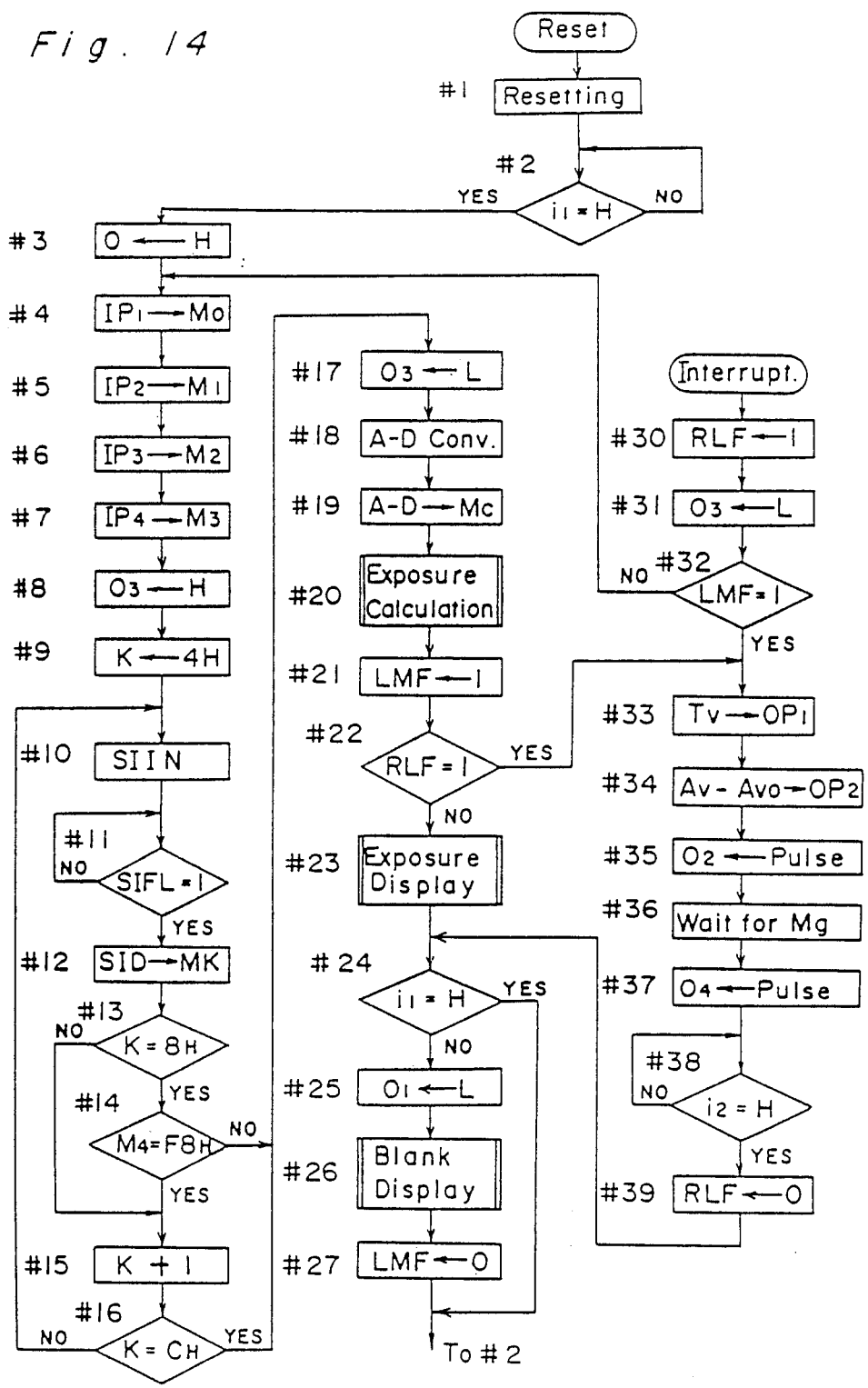
FIG. 14 a flow chart showing the sequence of operation of a microcomputer used in the circuit of FIG. 10(a)

FIG. 14 illustrates a flow chart showing the sequence of operation of the microcomputer MCO. Hereinafter, the operation of the circuits shown in FIGS. 10(a) and 10(b) will be described with reference to the flow chart of FIG. 14. When the main switch MAS is closed, the supply of the electric power from the battery power source BA to both the microcomputer MCO and the oscillator OSC through the power line +E is initiated and, at the same time, the microcomputer MCO, after having been reset by the reset signal from the power-on reset circuit POR, waits for the time to come when the input terminal i, is brought in a high level state at the step #2 as a result of closure of the light measuring switch LMS. When the input terminal i, is brought in the high level state, the output terminal 01 is brought in a high level state at the step #3, thereby causing the transistor BT50 to conduct through the inverter IN52 with the result that the electric power supply through the power line +V is initiated and, at the same time, the electric power supply to the lens assembly through the buffer BF is initiated. Subsequently, the preset data from the input ports IP1, IP2, IP3 and IP4 are successively taken in registers M0, M1, M2 and M3, respectively, thereby transferring to the step #8.

At the step #8, the output terminal 03 is rendered in a high level state, thereby releasing the counters C050 and C052 from the reset states while a K register is set with 4H. At the step #10, an instruction to read in the data serially is executed with the data read-in operation from the lens assembly consequently initiated until a completion flag SIFL becomes "1". When this flag SIFL subsequently becomes "1", the data taken in are set in a register Mk(M4 at first), and a register K determines as to whether or not they are "8". If K is not "8", the register K is incremented by one and the process proceeds to the step #16 at which determination is made as to whether or not K is "CH". If K is not found "CH", the process returns to the step #10 to enable the next succeeding data read-in operation. After the above described operation has been repeated, and when K is determined "8H" at the step #13, determination is made at the step #14 as to whether or not the contents of the register M4 are F8H". If they are not F8H", it means that either the lens assembly of fixed focal length is mounted or any lens assembly is not mounted and, therefore, the process proceed direct to the step #17 with no need for the microcomputer MCO to read in the data. On the contrary thereto, if they are found to be F8H", it means that the zoom lens assembly is mounted and, therefore, the process proceeds to the next step #15 to continue the data read-in operation. When K is found to become "CH" at the step #16, the process proceeds to the step #17. Accordingly, the register M4 is set with a discrimination code; the register M5 with Avo; the register M6 with Av max; the register M7 with fw; the register M8 with the release time lag; the register M9 with f; the register MA with $\Delta$Av; and the register MB with $\Delta$f.

At the step #17, the terminal 03 is brought in a low level state and the counters C050 and C052 are brought in reset state. At the step #18, the output from the light measuring circuit LMC is subjected to the analog-to-digital conversion and the converted data are set in a register Mc, and the exposure calculation is performed at the step #20.

Upon completion of the exposure calculation, the flag LMF is rendered 1 and, at the step #22, determination is made as to whether or not a flag RLF is 1. If the flag RLF is found to be 1, the process proceeds to the step #33, but if it is not found to be 1, the process proceeds to the step #23 at which the exposure display is made. The function of the flag RLF will be described later.

At the step #24, discrimination is made as to whether or not the input terminal i1 is in a high level state as a result of the closure of the light measuring switch LMS. If the terminal il is in a high level state, the process returns to the step #2 to repeat the operation from the step #3. On the other hand, if the terminal il is found to be in a low level state at the step #24, the output terminal 01 is rendered in a low level state at the step #25 to interrupt the power supply through the power line +V to the lens assembly. The display is a blank display with no information and, subsequently, after a light measurement flag LMF has been set in 0 at the step #27, the process returns to the step #2 to wait for the time to come when the light measuring switch LMS is again closed.

When the release switch RLS is closed during the opening of the switch EXS subsequent to the completion of the charging of the exposure control mechanism, the AND gate AN60 generates a high level signal with the interrupting terminal it consequently rendered in a high level state. As a result of this, the microcomputer MCO immediately starts the step #30 irrespective of what step it has been occupied, thereby setting a release flag RLF to 1 and, at the subsequent step #31, the output terminal 03 is brought in a low level state as a countermeasure against the occurrence of the interrupting operation during the serial data read-in operation. At the step #32, discrimination is made as to whether or not the flag LMF is 1. If the flag LMF is not found to be 1, it means that the calculation to give the exposure control data has not yet been finished, and therefore, the process proceeds to the step #4 thereby initiating the data read-in operation so that the exposure control data can be calculated. In such case, since the release flag RLF is set to 1 at the step #22, the step #22 shifts to the step #33.

If the flag LMF is found to be 1 at the step #32, the step #33 is initiated to supply the data Tv for the control of the exposure time from the output port OP1 to the exposure time control circuit TIC, to supply the data Av−Avo for the control of the stop down number from the output port OP2 to the aperture control circuit APC, and to supply a releasing pulse from the terminal 02 to the release circuit RLC for the exposure control mechanism.

At the step #36, the microcomputer MCO waits for a time Tl corresponding to the data of the release time lag which have been taken in the register M8. Thereafter, the releasing pulse is outputed from the output terminal 04 to the mirror-up release circuit MRL, and then waits until the terminal i2 is brought in a high level state as a result of the closure of the switch EXS subsequent to the completion of the exposure control operation. When the input terminal i2 is brought in the high level state at the step #38, the flag RLF is set to 0 at the step #39 and the process then proceeds to the step #24 so that, if the light measuring switch LMS is not closed, the operation starting from the step #2 can be repeated, but if the switch LMS is closed, the power supply is interrupted with the display erased, waiting, while the flag LMF is set to 0, for the time to come when the light measuring switch LMS is eventually closed.

Figure 15:
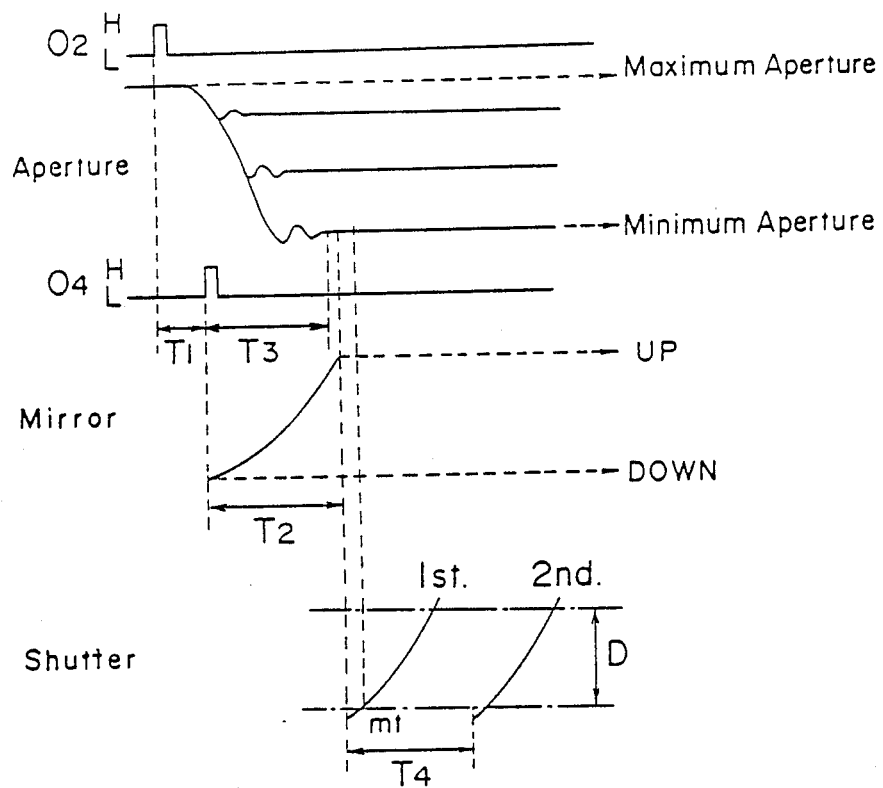
FIG. 15 is a time chart used to explain the exposure control operation.

FIG. 15 illustrates a time chart of the exposure control operation. When the releasing pulse is outputed from the output terminal 02 of the microcomputer MCO, the aperture is stopped down from the largest aperture and, after a time T1 subsequent to the generation of the pulse from the output terminal 02, a pulse emerges from the output terminal 04 to initiate the mirror-up movement. Upon completion of the mirror-up movement, an engagement of a leading curtain of the shutter is released by a mechanical structure to allow the leading curtain to travel and, after a time T4 subsequent to the start of travel of the leading shutter curtain (It is to be noted that the time T4 corresponds to the time of $2^{-Tv}$ counted by the exposure time control circuit TIC.), the trailing shutter curtain starts its travel.

If T1+T3≦T1+T2 wherein T2 is the time required to effect the mirror-up movement, and T1+T3 is the time required for the aperture to be stabilized at the smallest aperture subsequent to the generation of the pulse from the terminal 02 and being stopped down to the smallest aperture, the aperture is assuredly stabilized at a time mt at which, subsequent to the start of travel of the leading shutter curtain, an image frame D is exposed to the incoming light through the lens assembly and, therefore, there is no possibility of the occurrence of any irregular exposure. Since the value of T1+T3 varies with the type of a lens assembly, this variation can be compensated for if the time T1 is varied according to the data of the release time lag, and in this case, the possible occurrence of any irregular exposure resulting from the difference in speed at which the aperture is stopped can be eliminated no matter what type of a lens assembly is mounted.

While the second preferred embodiment of this invention has fully been described, it is to be noted that the above described ROM R050 may store the following data as fixed data. At the address of "00000101", the data of the error in amount of light measured under the full open metering system are stored, and the elimination of the error component included in the measured light output is made on the basis of these data. At the address of "00000110", discriminating data necessary to discriminate whether the lens assembly is of a type capable of being automatically focused by means of a motor, built in the lens assembly, in response to an instruction fed from the camera, of a type capable of being automatically focused by means of a motor in the camera body, of a type capable of being manually focused, or of a type unable to perform a focus detection based on the light reflected from the target object and passing through the lens assembly, are stored. At the address of "00000111", a conversion coefficient $K(N=K\cdot \Delta L)$ indicating the amount of drive N of the motor to be driven on the basis of a defocus amount $\Delta L$ from an automatic focus detecting device of the camera is stored. At the address of "00001000", data indicating the direction of rotation of the motor for shifting lens elements of the lens assembly are stored. At the address of "00001001", data of the amount of displacement $\Delta IR$ in position of the focus relative to the visible rays of light when the automatic focus detection performed by the camera is based on the infrared rays.

On the other hand, in the case with the zoom lens assembly, since as factors variable with change in focal length, there are K and $\Delta IR$ other than that described in connection with the foregoing embodiment, K and $\Delta IR$ are to be stored at the address of "10000000" to "10011111" and at the address of "10100000" to "10111111", respectively, so that K and $\Delta IR$ corresponding to the preset focal length can be outputed depending on the data from the code plate COD.

Figure 16:
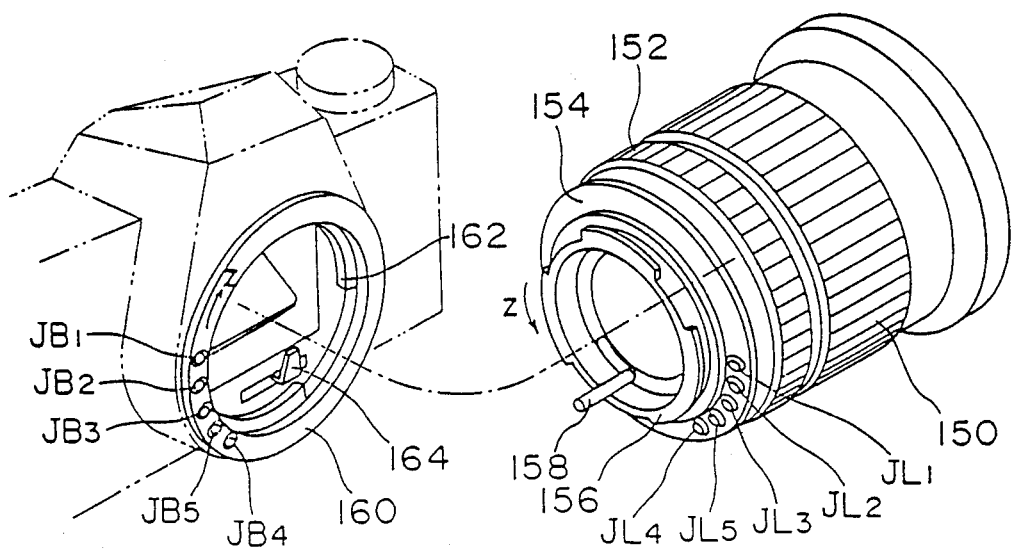
FIG. 16 a perspective view of the camera body and the zoom lens assembly showing the respective positions of coupling terminals, with the zoom lens assembly shown as separated from the camera body.

FIG. 16 illustrates the appearances of the camera body and the zoom lens assembly to which any one of the first and second embodiments of the present invention is practised. Reference numeral 150 represents a focusing ring, which, when rotated, causes a slide, similar to the slide VT shown in FIG. 4 and provided in the code plate 10 of FIG. 3 for providing the distance data, to move in sliding engagement on the patterned code. Reference numeral 152 represents a focal length adjusting ring which, when rotated, causes a slide, similar to the slide VT of FIG. 4 provided in the code plate COD of FIG. 10 or in the code plate 12 of FIG. 3 for providing the focal length data, to move in sliding engagement on the patterned code to provided from the code plate 12 or COD the data corresponding to the preset focal length.

In the lens assembly, reference numeral 154 represents an annular abutment face provided with the coupling terminals JL1 to JL5 in an angular row. Reference numeral 156 represents a bayonet pawls and reference numeral 158 represents a stop-down pin. On the other hand, in the camera body, reference numeral 160 represents a seat ring provided with the coupling terminals JB1 to JB5 in an angular row so similar to the angular row of the coupling terminals JL1 to JL5 that, when the lens assembly is mounted on or coupled to the camera body, the terminals JB1 to JB5 can be electrically connected with the terminals JL1 to JL5. Reference numeral 162 represents bayonet flanges integral with the seat ring 160, and reference numeral 164 represents an aperture stop-down control member engageable with the stop-down pin 158.

When the lens assembly is to be mounted on the camera body, the lens assembly is inserted into the camera body until the abutment face 154 contacts the seat ring 160. Subsequent rotation of the lens assembly relative to the camera body in a direction shown by the arrow Z results in clamping of the bayonet pawls 156 between the bayonet flanges 162 and associated leaf springs (not shown) disposed rearwardly of the bayonet flanges 162, thereby to lock the lens assembly in position relative to the camera body. At this time, the coupling terminals JB1 to JB5 are electrically connected with the coupling terminals JL1 to JL5.

As hereinbefore described, the coupling terminals JB1 and JL1 are for supplying the electric power from the camera body to the lens assembly therethrough; the coupling terminals JB2 and JL2 are for supplying the clock pulses from the camera body to the lens assembly therethrough; the couping terminals JB3 and JL3 are for supplying from the camera body to the lens assembly therethrough the signal necessary to release the circuit in the lens assembly from the reset state; the coupling terminals JB5 and JL5 are for transmitting the data from the lens assembly to the camera body therethrough; and the coupling terminals JB4 and JL4 are common ground potential terminals. Because of the particular arrangement described hereinabove, the coupling terminal JB1 connected to the power source does not contact any one of the coupling terminals JL1 to JL5 during the mounting of the lens assembly on the camera body and before it is locked in position relative to the camera body. This is particularly advantageous in that any possible damage to the circuit in the lens assembly and/or unnecessary wear of the battery power which would result when the coupling terminal JB1 contacts any one of the coupling terminals JL2 to JL5 during the mounting of the lens assembly on the camera body, that is, which would occur as a result of improper supply of the electric power from the camera body to the lens assembly, can be avoided.

We claim:

1. In a camera system having a camera body with a mount on which a first type of attachment, subject to an aperture size adjustment from the camera body, or a second type of attachment, incapable of the aperture size adjustment from the camera body, can be interchangeably mounted, the camera body comprising:
    first means for controlling an exposure of the camera in accordance with a manual setting;
    second means for controlling an exposure of the camera in accordance with a fully open aperture through the lens (TTL) light measurement;
    third means for controlling an exposure of the camera in accordance with an actually stopped-down aperture TTL light meaurement;
    means for identifying whether the attachment mounted on the mount is of the first type or of the second type, and
    means, responsive to said identifying means, for enabling said first and second controlling means when said identifying means identifies that the mounted attachment is of the first type, and for enabling said third controlling means when said identifying means identifies that the mounted attachment is of the second type.

2. The camera system of claim 1 further comprising means located in the camera body for measuring light through apertures of interchangeable lenses and means responsive to the measuring means for setting an aperture size.

3. The camera system of claim 1 wherein the means for identifying includes a read-only memory provided in an attachment with fixed data being transmitted to the camera body when the attachment is operatively attached to the camera body.

4. The camera system of claim 1 further including means for mounting a flash photography attachment, means for providing data representative of the quantity of flash light to be emitted during flash photography, and means for controlling the effective aperture value, including taking into account an input of the quantity of flash light data when the attachment is of the first type.

* * * * *